(12) United States Patent
D'Alencon et al.

(10) Patent No.: US 9,914,892 B2
(45) Date of Patent: *Mar. 13, 2018

(54) FUEL ADDITIVE COMPOSITION CONTAINING A DISPERSION OF IRON PARTICLES AND A DETERGENT

(75) Inventors: Lauriane D'Alencon, Paris (FR); Michael Lallemand, Saint Denis (FR); Virginie Harle, Senlis (FR); David J. Moreton, Derbyshire (GB); Malcolm G. J. MacDuff, Derbyshire (GB); Magali Pudlarz, Derbyshire (GB)

(73) Assignees: RHODIA OPERATIONS, Aubervilliers (FR); THE LUBRIZOL CORPORATION, Wickliffe, OH (US)

( * ) Notice: Subject to any disclaimer, the term of this patent is extended or adjusted under 35 U.S.C. 154(b) by 593 days.

This patent is subject to a terminal disclaimer.

(21) Appl. No.: 13/996,587

(22) PCT Filed: Dec. 20, 2011

(86) PCT No.: PCT/EP2011/073348
§ 371 (c)(1),
(2), (4) Date: Sep. 27, 2013

(87) PCT Pub. No.: WO2012/084906
PCT Pub. Date: Jun. 28, 2012

(65) Prior Publication Data
US 2014/0007494 A1    Jan. 9, 2014

(30) Foreign Application Priority Data
Dec. 22, 2010 (FR) .................. 10 61065

(51) Int. Cl.
| | | |
|---|---|---|
| C10L 1/00 | (2006.01) | |
| C10L 1/10 | (2006.01) | |
| C10L 10/04 | (2006.01) | |
| B01J 13/00 | (2006.01) | |
| C10L 10/06 | (2006.01) | |
| C10L 10/18 | (2006.01) | |
| C10L 1/12 | (2006.01) | |
| C10L 1/16 | (2006.01) | |
| C10L 1/188 | (2006.01) | |
| C10L 1/198 | (2006.01) | |
| C10L 1/222 | (2006.01) | |
| C10L 1/238 | (2006.01) | |
| C10L 1/2383 | (2006.01) | |
| C10L 1/2387 | (2006.01) | |

(52) U.S. Cl.
CPC ........... *C10L 10/04* (2013.01); *B01J 13/0026* (2013.01); *B01J 13/0034* (2013.01); *B01J 13/0047* (2013.01); *C10L 1/10* (2013.01); *C10L 10/06* (2013.01); *C10L 10/18* (2013.01); *C10L 1/1233* (2013.01); *C10L 1/1608* (2013.01); *C10L 1/1616* (2013.01); *C10L 1/1881* (2013.01); *C10L 1/198* (2013.01); *C10L 1/2222* (2013.01); *C10L 1/238* (2013.01); *C10L 1/2383* (2013.01); *C10L 1/2387* (2013.01)

(58) Field of Classification Search
CPC ...... C10L 1/1233; C10L 1/238; C10L 1/1608; C10L 1/1616; C10L 1/1881; C10L 1/198; C10L 1/2222; C10L 1/2383; C10L 1/2387; C10L 10/04; C10L 10/06; C10L 10/08; C10L 10/10; C10L 1/18; C10L 1/10; B01J 13/0026; B01J 13/0034; B01J 13/0047
USPC ..................................................... 44/307, 321
See application file for complete search history.

(56) References Cited

U.S. PATENT DOCUMENTS

| | | | |
|---|---|---|---|
| 6,136,048 A | 10/2000 | Birchem et al. | |
| 7,459,484 B2 | 12/2008 | Blanchard et al. | |
| 8,013,038 B2 | 9/2011 | Huether et al. | |
| 8,232,323 B2 * | 7/2012 | Thompson | ........................ 516/33 |
| 8,641,791 B2 | 2/2014 | Thompson | |
| 2006/0005465 A1 * | 1/2006 | Blanchard | .............. B01J 13/003 44/602 |
| 2007/0169406 A1 | 7/2007 | Blanchard et al. | |
| 2007/0180760 A1 | 8/2007 | Zhou et al. | |
| 2010/0101211 A1 * | 4/2010 | Thompson | ................ C10L 1/10 60/274 |
| 2010/0242342 A1 | 9/2010 | Reed et al. | |
| 2012/0192823 A1 * | 8/2012 | Harle et al. | .................... 123/1 A |

FOREIGN PATENT DOCUMENTS

| | | |
|---|---|---|
| FR | 2797199 A1 | 2/2001 |
| FR | 2833862 A1 | 6/2003 |
| FR | 2860443 A1 | 4/2005 |
| JP | 2010-522683 | 7/2010 |
| JP | 2010-522785 | 7/2010 |
| JP | 2010522782 A | 7/2010 |
| MX | 2010011341 A | 11/2010 |
| WO | 9719022 A1 | 5/1997 |

(Continued)

OTHER PUBLICATIONS

Laurent et al. "Magnetic Iron Oxide Nanoparticles: Synthesis, Stabilization, Vectorization, Physicochemical Characterizations, and Biological Applications".2008.Chem.Rev.108.pp. 2064-2110.*

(Continued)

*Primary Examiner* — Latosha Hines
(74) *Attorney, Agent, or Firm* — Young & Thompson

(57) ABSTRACT

A composition contains an additive for assisting with regeneration of the PF in the form of an organic dispersion of iron particles in crystallized form and a detergent including a quaternary ammonium salt.

19 Claims, No Drawings

(56) References Cited

FOREIGN PATENT DOCUMENTS

| WO | 03053560 A1 | 7/2003 | |
|---|---|---|---|
| WO | 2006135881 A2 | 12/2006 | |
| WO | WO 2006135881 A2 * | 12/2006 | ............... C08F 8/32 |
| WO | 2008116550 A1 | 10/2008 | |
| WO | 2008116552 A1 | 10/2008 | |
| WO | 2009140190 A1 | 11/2009 | |
| WO | 2010150040 A1 | 12/2010 | |

OTHER PUBLICATIONS

International Search Report dated May 14, 2012, from corresponding PCT application.

* cited by examiner

FUEL ADDITIVE COMPOSITION CONTAINING A DISPERSION OF IRON PARTICLES AND A DETERGENT

The present invention relates to the association of an organic dispersion of iron particles and of a detergent within a composition notably useful as a fuel additive for internal combustion engines.

During combustion of fuel and notably of gas oil in an engine, the carbonaceous products tend to form carbonaceous particles, which will be designated in the following of the description under the expression of "soots", which are said to be noxious both for the environment and for health. For a long time, there has been a search for techniques with which the emission of these soots may be reduced.

A satisfactory solution consists of introducing into the exhaust line a particle filter (or PF in the following of the text) which will block soots in its channels in order to let a gas escape without any soots. When a certain amount of accumulated soots in the PF is attained, the soots are burned in order to free the channels of the PF. This step for regenerating the PF is usually accomplished at greater temperatures than the temperature of the gas during normal operation of the engine, the soots usually burning in air at temperatures above 650° C.

In order to assist with regeneration of the PF, a catalyst is generally used which has the purpose of facilitating oxidation of the soots either directly or indirectly. By facilitating the oxidation of the soots is meant the fact of allowing their oxidation at a lower temperature so that this temperature is attained more frequently during normal operation of the engine. A portion of the soots may thus be continuously burned during the operation of the engine.

The catalyst also gives the possibility of lowering the temperature required for regenerating the PF so that the regeneration temperature is less than the combustion temperature of the soots without the presence of said catalyst. The catalyst also allows acceleration of the oxidation rate of the soots which allows a reduction in the required time for regenerating the PF.

The use of an additive for assisting with regeneration of the PF, vectorized by the fuel feeding the engine or further a fuel borne catalyst (FBC), proved to meet many criteria since it allows regeneration of the PF more rapidly and at a lower temperature than the competing technology called catalyzed soot filter (CSF, the catalyst being immobilized in the PF), which contributes to reducing fuel consumption for regenerating the PF (and thus reducing $CO_2$ emissions).

New engine technologies, such as diesel engines with a common-rail system and high pressure direct fuel injection, are performing but however sensitive to fuel quality. It is notably known that deposits may notably form in injectors of diesel engines during their operation. The amount of deposit and their rate of formation depend on the quality of the fuel used in the engine but also on the nature of the fuel additives present in the latter.

By <<fuel additive>> is meant here any additive allowing improvement in the distribution of the fuel in the engine and/or improvement in the operating performances of the engine and/or improvement in the operating stability of the engine over time. Fuels which contain unstable components, like fatty acid methyl esters generally present in biofuels, tend to form more deposit than mineral fuels not containing any of them.

Further, the presence of certain metals in fuels like copper or zinc may lead to increased amounts of deposit and thus to exacerbated fouling levels of the injectors. The metals present in fuels stem from various origins like from the fuel and from the fuel distribution network or from any other contamination. Metals may also be deliberately introduced into the fuel like in the case of metal additives for assisting regeneration of the PF. Even if these additives are beneficial for regeneration of the PF and are thus desirable, some may promote the formation of deposit in the fuel circuit and most particularly in fuel injectors.

Deposits may lead to a loss of power of the engine and may possibly go all the way to damaging the engine. These deposits may also degrade the quality of the combustion in the cylinders and lead to an increase in polluting emissions and in engine fuel consumption. It is known that detergent additives reduce or suppress formation of deposit in the injectors.

Among fuel additives for assisting with the regeneration of the PF, dispersions of rare earths, notably based on cerium, and/or iron are known to be efficient for regenerating the PF and consecrated to the reduction of the oxidation temperature of the soots. These dispersions should have good dispersibility, high stability over time and sufficient catalytic activity at a relatively not very high concentration in the fuel into which they are introduced.

The dispersions known to this day do not always meet all these criteria. They may have for example good dispersibility but insufficient stability, notably when they are introduced into fuels containing fatty acid methyl esters or another easily oxidizable fuel of vegetable origin. These dispersions may be sufficiently stable but may have catalytic activity at too high metal concentrations for them to be economically of interest. Moreover, as indicated earlier, all these dispersions should have a limited impact on the operation of fuel injectors, notably to lead to limited fouling of the latter, even in the presence of a fuel containing biofuel or further a fuel containing metals. Further the presence of an FBC in the fuel may lead to a reduction in the oxidation resistance of the fuel, notably when it contains biofuels.

Therefore, it is sought to provide compositions comprising an additive for assisting regeneration of the PF with good stability and which lead to low fouling of the injectors and to a limited reduction in the oxidation resistance of the fuel, notably in the presence of a biofuel.

Preferably it is sought to provide compositions comprising an additive having sufficient catalytic activity at a relatively not very high concentration.

An object of the invention is to provide a well-adapted composition for this type of use.

For this purpose, the invention proposes a composition comprising an additive for assisting regeneration of the PF in the form of an organic dispersion of iron particles in the crystallized form and of a detergent comprising a quaternary ammonium salt.

The dispersion comprises particles of an iron compound in crystallized form of small size and at least one amphiphilic agent.

In certain cases, the detergent may further include an oxygenated detergent.

The invention also provides an additived fuel comprising a fuel and the composition described earlier.

More specifically, the invention relates to a composition comprising a dispersion and a detergent comprising a quaternary ammonium salt, said dispersion comprising:
  an organic phase;
  at least one amphiphilic agent, and
  solid objects dispersed in the organic phase in the form of individualized particles or particle aggregates, consisting of an iron compound in the crystallized form, such that said particles have an average size $\overline{d}_{XRD}$ of less than or equal to 12 nm as measured by X-ray diffraction (XRD).

The Organic Dispersion

The dispersion of the composition according to the invention may be prepared according to a method comprising the following steps:

a) putting into contact in an aqueous phase a base and a mixture comprising an Fe(II) salt and an Fe(III) salt according to a molar ratio Fe(II)/Fe(III) comprised from 0.45 to 0.55, preferably about equal to 0.5, advantageously equal to 0.5, by maintaining the pH of the aqueous phase at a pH value of more than 8, whereby a precipitate is obtained; and b) putting into contact the thereby obtained precipitate, optionally separated from the aqueous phase, with an organic phase, in the presence of an amphiphilic agent, whereby the dispersion is obtained in an organic phase.

The solid objects dispersed in the dispersions of the invention are individualized solid particles or aggregates of such particles. Said particles may further possibly contain residual amounts of bound or adsorbed ions such as for example sodium ions or ammonium ions.

The dispersion of the invention has the advantage of being very stable. The particles of the dispersion of the invention do not settle, and the dispersions do not decant, even after several months. Further, it may have good compatibility with fuels of the gas oil type notably based on biofuels.

According to a preferred alternative, it may further have high catalytic activity.

The dispersion of the composition of the invention is a dispersion in an organic phase.

For this purpose, most often, the organic phase consists of at least 80%, preferably at least 90%, preferably at least 95% by mass of an organic solvent or of a mixture of organic solvents, based on the total mass of the organic phase.

The organic phase optionally only consists of an organic solvent or a mixture of organic solvents.

This organic phase is selected notably according to the use of the dispersion.

As an example of an organic phase, mention may be made of aliphatic hydrocarbons such as hexane, heptane, octane, nonane, cycloaliphatic hydrocarbons such as cyclohexane, cyclopentane, cycloheptane, aromatic hydrocarbons such as benzene, toluene, ethylbenzene, xylenes, liquid naphthenes. Petroleum cuts of the Isopar or Solvesso (registered trademark by EXXON) type, notably Isopar L or Solvesso 100 which essentially contains a mixture of methyl ethyl and trimethyl benzene, Solvesso 150 which contains a mixture of alkylbenzenes, in particular dimethyl benzene and tetraethyl benzene, are also suitable. The organic phase may also consist of a petroleum cut.

It is also possible to apply for the organic phase, polar chlorinated hydrocarbons such as chloro- or dichloro-benzene, chlorotoluene. Ethers as well as aliphatic and cycloaliphatic ketones such as for example diisopropyl ether, dibutyl ether, methylisobutylketone, diisobutylketone, mesityl oxide, may be contemplated.

It is also possible to contemplate polar solvents based on alcohol such as 2-ethylhexanol.

The organic phase may also advantageously be based on an apolar hydrocarbon notably like aliphatic hydrocarbons.

In this preferred category, mention may be made of petroleum cuts of the Isopar type essentially containing isoparaffinic and paraffinic $C_{11}$ and $C_{12}$ hydrocarbons.

The dispersion according to the invention includes at least one amphiphilic agent.

This amphiphilic agent has the effect of stabilizing the dispersion of particles. It is also used as a phase transfer agent during the preparation of the dispersions (between the aqueous phase and the organic phase).

Preferably, the amphiphilic agent is a carboxylic acid which generally includes from 10 to 50 carbon atoms, preferably from 10 to 25 carbon atoms.

This acid may be linear or branched. It may be selected from aryl, aliphatic or arylaliphatic acids optionally bearing other functions provided that these functions are stable in the media which are desirably used for the dispersions according to the present invention.

Thus, it is possible to apply for example aliphatic carboxylic acids which are natural or synthetic. Of course, it is possible to use acids in a mixture.

As an example, mention may be made of fatty acids of tallol, soya bean, tallow oil, flax oil, oleic acid, linoleic acid, stearic acid and its isomers, pelargonic acid, capric acid, lauric acid, myristic acid, dodecylbenzenesulfonic acid, ethyl-2-hexanoic acid, naphthenic acid, hexanoic acid.

As a preferred amphiphilic agent, mention may be made of stearic acid and of its isomers such as for example a mixture of acids or products which contain chain length distributions like Prisorine 3501 from Croda.

This amphiphilic agent may also consist of one or several polyacids such as succinic acids substituted with polybutenyl groups. These polyacids may be used alone or in combination with one or several aliphatic monocarboxylic acids containing between 10 and 20 carbon atoms on average.

As an example, mention may be made of the mixture of oleic acid with one or several succinic acids substituted with polybutenyl groups, in which the polybutenyl groups have an average molecular weight (measured by gas chromatography) comprised between 500 and 1,300 and more particularly between 700 and 1,000 g·mol$^{-1}$.

According to a feature of the invention, the particles of the dispersion of the invention are based on an iron compound in crystallized form.

This crystallized form which may be obtained by applying the steps of the aforementioned method, may notably be observed by the X-ray diffraction technique (XRD) which shows characteristic peaks of at least one defined crystallized structure of iron.

The solid objects of the dispersion of the invention are in the form or particles, or aggregates of particles, of an iron compound, the composition of which essentially corresponds to an iron oxide in crystallized form.

The crystallized forms of iron oxide making up the particles according to the invention are typically Fe(III) oxides of the maghemite ($\gamma$-$Fe_2O_3$) type and/or Fe(II) and Fe(III) oxides of the magnetite ($Fe_3O_4$) type.

The aforementioned method generally gives the possibility of obtaining particles based on Fe(III) oxide of the maghemite type and/or Fe(II) and Fe(III) oxide of the magnetite type, the magnetite may then be oxidized into Fe(III) oxide of the maghemite type, for example upon contact with oxygen.

Preferably, the particles with a size greater than or equal to 4 nm in the dispersion are, for at least 90% of them, in the form of an iron compound in crystallized form, advantageously at least 95%, preferentially at least 99%.

According to another feature of the invention, the average size $\overline{D}_{XRD}$ as measured by XRD of the particles of the dispersion is less than or equal to 12 nm.

Preferably, the average size $\overline{D}_{XRD}$ as measured by XRD of the particles of the dispersion is less than or equal to 8 nm, preferably less than or equal to 7 nm, preferentially less than or equal to 6 nm and advantageously less than or equal to 5 nm.

Generally this size is of at least 4 nm.

The crystallized nature of the particles according to the invention may notably be detected by XRD analysis. The XRD diagram allows the definition of two characteristics of these particles:

the nature of the crystalline phase: the position of the measured diffraction peaks as well as their relative intensity are characteristic of the magnetite or maghemite phase, the crystalline phase then corresponding to the sheet ICDD 01-088-0315; and the average size $\overline{D}_{XRD}$ of crystallites (or crystallized domains), this size is calculated from the width at half-height of the diffraction peak of the crystallographic plane (440) of maghemite/magnetite:

$$\overline{D}_{XRD} = \frac{k \cdot \lambda}{\sqrt{H^2 - s^2} \cdot \cos\theta}$$

with:

λ: wavelength=1.54 Å, k: form factor equal to 0.89,

H: total width at half-height of the relevant line, expressed in degrees, s: instrumental width at the angle θ as determined by $LaB_6$ analysis=0.072°, θ diffraction angle (in radians) of the diffraction peak (440) of magnetite and/or maghemite=0.547 rad.

The XRD analysis may for example be carried out on a commercial apparatus of the X'Pert PRO MPD PANalytical type, notably consisting of a θ-θ goniometer, allowing characterization of liquid samples. The sample remains horizontal during the acquisition and it is the source and the detector which move.

This installation is driven by the X'Pert Datacollector software package provided by the supplier and utilization of the obtained diffraction diagrams may be performed by means of the X'Pert HighScore Plus software package, version 2.0 or above (supplier: PANalytical).

According to another feature of the invention, it is preferable that the essential of the particles, i.e. at least 80% by number, have a size $D_{TEM}$ of less than or equal to 12 nm, more particularly less than or equal to 8 nm, preferably less than or equal to 7 nm, preferentially less than or equal to 6 nm.

Typically, at least 90% and more particularly at least 95% of the particles have a size $D_{TEM}$ of less than or equal to the aforementioned values.

This size $D_{TEM}$ may be detected by analyzing the dispersion with transmission electron microscopy (TEM), used in an imaging mode with which the particles may be viewed at high magnification and their size may be measured.

Preferably, and for better accuracy of the measurement of the size of the particles, it is possible to proceed according to the following procedure.

The dispersion according to the invention is diluted beforehand by its solvent so as to obtain an iron mass content of about 0.035%. The thereby diluted dispersion is then placed on an observation grid (like a carbonaceous polymeric membrane supported on a copper grid) and the solvent is evaporated.

For example it is possible to use a transmission electron microscope giving access to magnifications ranging up to 800,000, the acceleration voltage being selected preferably equal to 120 kV.

The principle of the method consists of examining under the microscope various regions (about 10) and of measuring the dimensions of 250 particles, by considering these particles as spherical particles. A particle is estimated as being identifiable when at least half of its perimeter may be defined. The size $D_{TEM}$ then corresponds to the diameter of the circle properly reproducing the circumference of the particle. Identification of the particles which may be utilized, may be accomplished by means of a software package such as ImageJ, Adobe Photoshop or Analysis.

A cumulated grain size distribution of the particles is inferred therefrom, which is grouped into 40 grain size classes ranging from 0 to 20 nm, the width of each class being 0.5 nm. The number of particles in each class or for each $D_{TEM}$ is the basic datum for representing the number differential grain size distribution.

Further, the particles of the dispersion of the invention preferably have a fine grain size as observed by TEM.

They have a median diameter $\varphi_{50}$ preferably comprised between 3 nm and 12 nm, more particularly between 4 nm and 10 nm.

The number median diameter $\varphi_{50}$ is the diameter such that 50% of the particles counted on the TEM micrographs have a smaller diameter than this value, and 50% of the counted particles have a larger diameter than this value.

The particles according to the invention preferably have a polydispersity index $P_n$ comprised from 0.1 to 0.5.

This polydispersity index $P_n$ is calculated from the number grain size distribution determined by TEM according to the following formula:

$$P_n = \frac{\Phi_{84} - \Phi_{16}}{2 \cdot \Phi_{50}}$$

$\varphi_{16}$ being the diameter for which 16% of the particles have a diameter of less than this value, and $\varphi_{84}$ being the diameter for which 84% of the particles have a diameter of less than this value.

The particles according to the invention meeting this criterion have good monodispersity.

The dispersion state of the solid objects may be characterized by dynamic light scattering (DLS), further called quasi-elastic light scattering (QELS), or further photon correlation spectroscopy. This technique allows measurement of a hydrodynamic diameter $D_h$ of the solid objects, the value of which is highly affected by the presence of aggregates of particles.

According to a preferential characteristic of the invention, the solid objects of the invention have a hydrodynamic diameter $D_h$ of less than or equal to 50 nm, preferably less than or equal to 30 nm, preferentially less than or equal to 20 nm, advantageously less than or equal to 16 nm, as measured by dynamic light scattering (DLS).

The hydrodynamic diameter $D_h$ of the solid objects of a dispersion according to the invention may be measured on the dispersion of the invention, after dilution of the latter by its solvent so as to attain an iron concentration comprised from 1 to 4 $g \cdot L^{-1}$.

A light scattering apparatus of the ALV CGS 3 (Malvern) apparatus provided with an ALV series 5000 correlator and with an ALV Correlator software package V3.0 or above.

This apparatus uses the so-called <<Koppel cumulants>> data processing method, which gives the possibility of accessing the value of the hydrodynamic diameter $D_h$.

It is important to conduct the measurement at the temperature (typically 25° C.) corresponding to the viscosity values and to the refractive index values used for the solvent in the calculation of the hydrodynamic diameter and to use a measurement angle typically set to 90°.

It is also recommended to carry out the preparations of the dilution as well as the handling operations under a laminar flow hood in order to avoid contamination of the samples by dust and distort the measurement.

It is considered that the experimental data are validated if the scattered intensity is stable and if the autocorrelation function is without any abnormalities.

Finally, the scattering intensity should be comprised within limits defined for each apparatus.

This preferred characteristic of the objects of the dispersion increases its stability. The individualized nature of the particles also increases the global contact surface area available between the latter and the soots and thus contributes to improving the catalytic activity of the dispersion according to the invention.

The dispersions according to the invention may further comprise in the organic phase, particles of an iron compound in the amorphous form, notably particles for which the size is greater than or equal to 4 nm.

The amorphous nature of an iron compound may be shown by XRD analysis of this compound, when no characteristic peak of any crystalline iron phase is observed.

Preferably, the particles of an iron compound in the amorphous form represent at most 75% by number of the total amount of iron particles of the dispersion.

For particles with a size greater than or equal to 4 nm, the particles of an iron compound in the amorphous form represent at most 50% by number of the total amount of iron particles with a size greater than or equal to 4 nm, and preferably at most 40% by number.

According to a particular embodiment of the invention, the solid objects dispersed in the dispersion (DSP1) of the composition according to the invention are in the form of individualized particles or particle aggregates, consisting of an iron compound in crystallized form, such that:
   said particles have an average size $\overline{D}_{XRD}$ of less than or equal to 7 nm as measured by X-ray diffraction (XRD); and
   at least 80% by number of said particles have a size $D_{TEM}$ of less than or equal to 7 nm as measured by transmission electron microscopy (TEM).

The solid objects of this dispersion (DSP1) may preferably have a hydrodynamic diameter $D_h$ of less than or equal to 30 nm as measured by dynamic light scattering (DLS).

According to another particular embodiment of the invention, the organic phase of the dispersion (DSP2) of the composition according to the invention is an apolar organic phase and the solid objects dispersed in the dispersion of the composition according to the invention are in the form of individualized particles or particle aggregates, consisting of an iron compound in crystallized form, such that:
   said solid objects have a hydrodynamic diameter $D_h$ of less than or equal to 30 nm as measured by dynamic light scattering (DLS);
   said particles have an average size $\overline{D}_{XRD}$ of less than or equal to 7 nm as measured by X-ray diffraction (XRD); and
   at least 80% by number of said particles have a size $D_{TEM}$ of less than or equal to 7 nm as measured by transmission electron microscopy (TEM).

Preferential or more particular values of the parameters $\overline{D}_{XRD}$, $D_h$, $D_{TEM}$ as well as of the diameter $\varphi_{50}$ and of the index $P_n$, given above are also applied here for the dispersions DSP 1 and DSP 2 insofar that these values also meet the limits given above in the listing of the characteristics of DSP 1 and DSP 2.

The dispersions according to the invention have a mass concentration of the iron compound which may be of at least 2%, more particularly of at least 5%, this concentration being expressed in the mass of iron metal relatively to the total mass of the dispersion.

This concentration may generally range up to 20%.

The iron content may be determined by any technique known to one skilled in the art such as by the measurement with X fluorescence spectroscopy directly applied onto the dispersion according to the invention.

The present invention also relates to a method for preparing the dispersions of the invention.

In step a) of the method, a base and a mixture comprising an Fe(II) salt and an Fe(III) salt according to a molar ratio (Fe(II)/Fe(III)) comprised from 0.45 to 0.55, preferably about equal to 0.5, advantageously equal to 0.5, are put into contact in an aqueous phase, typically an aqueous solution of the base and of the iron salts.

As a base, it is possible to notably use compounds of the hydroxide type. Mention may be made of alkaline or earth alkaline hydroxides and ammonia. It is also possible to use secondary, tertiary or quaternary amines.

As an iron salt, it is possible to use any water-soluble salt. As an Fe(II) salt, mention may be made of ferrous chloride $FeCl_2$. As an Fe(III) salt, mention may be made of ferric nitrate $Fe(NO_3)_3$.

During step a), the reaction occurring between the Fe(II) salt, the Fe(III) salt and the base is generally accomplished under conditions such that the pH of the formed reaction mixture remains greater than or equal to 8 upon putting into contact the iron salts and the base in the reaction medium.

Preferably, during step a), the pH of the reaction mixture is maintained at a value greater than or equal to 8. This pH value is typically comprised between 9 and 13.

The putting into contact of the iron salts and of the base in an aqueous phase may be accomplished by introducing a solution of the iron salts into a solution containing the base, for which the pH is of at least 8. It is also possible to introduce the iron salts and the base in a solution containing salts, at a concentration typically less or equal to 3 mol·L$^{-1}$, such as for example sodium nitrate, and for which the pH is adjusted beforehand to a value greater than or equal to 8. It is possible to continuously achieve the contacting, the pH condition being fulfilled by adjusting the respective flow rates of the solution of the iron salts and of the solution containing the base.

It is possible, according to a preferred embodiment of the invention, to operate under conditions such that during the reaction between the iron salts and the base, the pH of the aqueous phase is maintained constant. By maintaining the pH constant, is meant a variation of the pH of ±0.2 pH units relatively to the set value. Such conditions may be obtained by addition, during the reaction between the iron salts and the base, for example upon introducing the solution of the iron salts into the solution of the base, of an additional amount of base into the aqueous phase.

Within the scope of the present invention, the inventors have observed that the size of the particles may be modulated depending on the pH at which is maintained the aqueous phase. Typically, and without intending to be bound to a particular theory, the size of the particles is all the smaller since the pH of the aqueous phase is high.

The reaction of step a) is generally conducted at room temperature. This reaction may advantageously be achieved under an air or nitrogen or nitrogen-air mixture atmosphere.

At the end of the reaction of step a), a precipitate is obtained, It is optionally possible to subject the precipitate to ripening by maintaining it for a certain time, for example a few hours, in the aqueous phase.

According to a first advantageous alternative of the method according to the invention, the precipitate is not separated from the aqueous phase at the end of step a) and is left suspended in the aqueous phase of the reaction of step a).

According to another alternative of the method according to the invention, the method comprises, after step a) and before step b), a step a) for separating the precipitate formed at the end of step a) from the aqueous phase.

This separation step a) is carried out by any known means.

The separated precipitate may then be washed with water for example. Preferably, the precipitate is not subject to any drying or freeze-drying step or any operation of this type.

The precipitate may optionally be resuspended in a second aqueous phase.

In order to obtain a dispersion in an organic phase, during step b), the precipitate obtained at the end of step a), whether it is separated from the aqueous phase or not, is put into contact with the organic phase in which the dispersion is desirably obtained.

This organic phase is of the type which has been described above.

The contacting of step b) is accomplished in the presence of the aforementioned amphiphilic agent, optionally after neutralization of the suspension obtained at the end of step a).

Preferably, the molar ratio between the number of moles of amphiphilic agent and the number of moles of iron is from 0.2 to 1, preferentially from 0.2 to 0.8.

The amount of organic phase to be incorporated is adjusted so as to obtain an oxide concentration as mentioned above.

The order of the introduction during step b) of the different elements of the dispersion is indifferent.

It is possible to put into contact the obtained precipitate, the amphiphilic agent and the organic phase, simultaneously.

It is also possible to produce the premix of the amphiphilic agent and of the organic phase.

The contacting between the precipitate and the organic phase may be accomplished in a reactor which is under an air, nitrogen or air-nitrogen mixture atmosphere.

Although the contact between the precipitate and the organic phase may be accomplished at room temperature, about 20° C., it is preferable to operate at a temperature selected in a range from 30° C. to 150° C., advantageously between 40° C. and 100° C.

In certain cases, due to the volatility of the organic phase, its vapors should be condensed by cooling it down to a temperature below its boiling point.

The reaction mixture resulting from the precipitate, from the organic phase and from the amphiphilic agent is maintained with stirring during the whole duration of the heating.

In the case of the first alternative where the precipitate has not been separated from the aqueous phase at the end of step a), when the heating is stopped, the presence of two new phases is noted: an organic phase containing the dispersion of particles, and a residual aqueous phase. The organic phase is then separated, containing the dispersion of particles and the residual aqueous phase according to conventional separation techniques, such as for example decantation or centrifugation.

Regardless of the alternative of the method, according to the present invention, organic dispersions are obtained at the end of step b), which have the aforementioned features.

The dispersions further comprising particles of an iron compound in amorphous form may be obtained by mixing a first dispersion of particles of an iron compound in amorphous form in an organic phase with a second dispersion of particles of an iron compound in crystallized form, this second dispersion being of the type according to the first embodiment of the invention.

As a first dispersion of particles of an iron compound in amorphous form those described in WO 2003/053560 may be used for example.

Dispersions for which the organic phases are identical are preferably mixed.

Detergent Based on a Quaternary Ammonium Salt

The composition of the present invention comprises a detergent composition comprising a quaternary ammonium salt.

The quaternary ammonium salts may be the reaction product:
  (i) of at least one compound which may comprise:
    (a) the condensation product of an acylation agent with hydrocarbon substitution and of a compound comprising an oxygen or nitrogen atom capable of condensing the acylation agent, the condensation product having at least one tertiary amine function;
    (b) an amine with polyalkene substitution comprising at least one tertiary amine function; and
    (c) a Mannich reaction product comprising at least one tertiary amine function, the Mannich reaction product being derived from a phenyl with hydrocarbon substitution, and aldehyde and an amine; and
  (ii) of a suitable quaternization agent for converting the tertiary amine function of the compound (i) into quaternary nitrogen.

The quaternization agent may comprise dialkyl sulfates, benzyl halides, carbonates with hydrocarbon substitution; epoxides with hydrocarbon substitution in combination with an acid or mixtures thereof.

The compounds of the constituents (i)(a), (i)(b) an (i)(c), described in more details below, contain at least one tertiary amine function and cover the compounds which may be alkylated in order to contain at least one tertiary amine function after an alkylation step.

Examples of the quaternary ammonium salt and of the methods allowing their preparation are described in U.S. Pat. Nos. 4,253,980, 3,778,371, 4,171,959, 4,326,973, 4,338,206 et 5,254,138.

The quaternary ammonium salts may be prepared in the presence of a solvent which may be removed or not once the reaction is completed. As suitable solvents, mention may be made, but without any limitation of a diluting oil, petroleum naphtha and certain alcohols.

In an embodiment, these alcohols contain at least 2 carbon atoms and in other embodiments at least 4, at least 6 or at least 8 carbon atoms.

In another embodiment, the solvent of the present invention contains from 2 to 20 carbon atoms, from 4 to 16 carbon atoms, from 6 to 12 carbon atoms, from 8 to 10 carbon atoms or only 8 carbon atoms. These alcohols normally bear a $C_1$-$C_4$ 2-alkyl substituent, i.e. a methyl, ethyl, or any propyl or butyl isomer. As examples of suitable alcohols, mention may be made of 2-methylheptanol, 2-methyldecanol, 2-ethylpentanol, 2-ethylhexanol, 2-ethylnonanol, 2-propylheptanol, 2-butylheptanol, 2-butyloctanol, isooctanol, dodecanol, cyclohexanol, methanol, ethanol, propan-1-ol, 2-methylpropan-2-ol, 2-methylpropan-1-ol, butan-1-ol, butan-2-ol, pentanol and its isomers, and mixtures thereof.

In an embodiment, the solvent of the present invention is 2-ethylhexanol, 2-ethylnonanol, 2-methylheptanol, or combinations thereof.

In an embodiment, the solvent of the present invention comprises 2-ethylhexanol.

Succinimide Quaternary Ammonium Salts

In an embodiment, the quaternary ammonium salt detergent comprises the reaction product:

(i)(a) of the condensation product of an acylation agent with hydrocarbon substitution and a compound comprising an oxygen or nitrogen atom capable of condensing with said acylation agent, the condensation product having at least one tertiary amine function; and (ii) of a suitable quaternization agent for converting the tertiary amine function of the compound (i) into a quaternary nitrogen.

Among the useful acylation agents with hydrocarbon substitution in the present invention, mention may be made of the reaction product of a long chain hydrocarbon, generally a polyolefin, with a mono-unsaturated carboxylic acid or one of its derivatives.

As suitable mono-unsaturated carboxylic acids or their derivatives, mention may be made of:

(i) α,β-mono-unsaturated $C_4$-$C_{10}$ dicarboxylic acids such as fumaric acid, itaconic acid, maleic acid;

(ii) derivatives of (i), such as anhydrides or mono- or di-esters of (i) derived from a $C_1$-$C_5$ alcohol;

(iii) α,β-mono-unsaturated $C_3$-$C_{10}$ monocarboxylic acids, such as acrylic acid and methacrylic acid; or (iv) derivatives of (iii), such as esters of (iii) derived from a $C_1$-$C_5$ alcohol.

As suitable long chain hydrocarbons to be used in the preparation of acylation agents with hydrocarbon substitution, mention may be made of any compound containing an olefinic bond, illustrated by the following general formula (I):

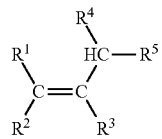

(I)

wherein each of $R^1$, $R^2$, $R^3$, $R^4$ and $R^5$ represent, independently of each other, a hydrogen atom or a hydrocarbon group.

In certain embodiments, at least one of the radicals $R^3$, $R^4$ or $R^5$ represents a hydrocarbon group containing at least 20 carbon atoms.

These long chain hydrocarbons which may also be described as being polyolefins or polymers of olefins, are reacted with mono-unsaturated carboxylic acids and the derivatives described above for forming the acylation agents with hydrocarbon substitution used for preparing the nitrogen-containing detergent of the present invention.

As suitable olefin polymers, mention may be made of polymers comprising a majority by moles of $C_2$-$C_{20}$, or $C_2$-$C_5$ mono-olefins. Among these olefins, mention may be made of ethylene, propylene, butylene, isobutylene, pentene, octene-1 or styrene. The polymers may be homopolymers, such as polyisobutylene, as well as copolymers of two or more than two of these olefins. As suitable copolymers, mention may be made of copolymers of ethylene and propylene, of butylene and isobutylene, and of propylene and of isobutylene. As other suitable copolymers, mention may be made of those in which a minority by moles of the monomers of the copolymer, for example from 1 to 10% by moles, is a $C_4$-$C_{18}$ diolefin. Among these polymers, mention may be made of: a copolymer of isobutylene and butadiene; and a copolymer of ethylene, propylene and 1,4-hexadiene.

In an embodiment, at least one of the groups —R of the formula (I) indicated above is derived from polybutene, i.e. polymers of $C_4$ olefins, notably of 1-butene, 2-butene and isobutylene. As $C_4$ polymers, mention may be made of polyisobutylene.

In another embodiment, at least one of the groups —R of formula (I) is derived from polymers of ethylene and alpha-olefin, notably ethylene-propylene-diene polymers. As examples of documents which have described copolymers of ethylene and alpha-olefin and ethylene-(lower olefin)-diene terpolymers, mention may be made of U.S. Pat. Nos. 3,598,738, 4,026,809, 4,032,700, 4,137,185, 4,156,061, 4,320,019, 4,357,250, 4,658,078, 4,668,834, 4,937,299 and 5,324,800.

In another embodiment, the olefinic bonds of formula (I) are mainly vinylidene groups, illustrated by the following formula (II):

(II)

wherein each R is a hydrocarbon group, which in certain embodiments may be:

(III)

wherein R represents a hydrocarbon group.

In an embodiment, the vinylidene content of formula (I) may represent at least 30% by moles of vinylidene groups, at least 50% by moles of vinylidene groups, or at least 70% by moles of vinylidene groups. Such products and preparation methods are described in U.S. Pat. Nos. 5,071,919, 5,137,978, 5,137,980, 5,286,823, 5,408,018, 6,562,913, 6,683,138, 7,037,999, and in documents US 2004/0176552A1, 2005/0137363 and 2006/0079652A1. Such products are commercially available from BASF, under the brand of GLISSOPAL™ and, from Texas PetroChemical LP, under the brand of TPC 1105™ and TPC 595™.

The methods for making acylation agents with hydrocarbon substitution by reaction of reagents of the mono-unsaturated carboxylic acid type and of compounds of formula (I) are well known in the art and are disclosed in U.S. Pat. Nos. 3,361,673, 3,401,118, 3,087,436, 3,172,892, 3,272,746, 3,215,707, 3,231,587, 3,912,764, 4,110,349, 4,234,435, 6,077,909 and 6,165,235.

In another embodiment, the acylation agent with hydrocarbon substitution may be made by reaction of a compound illustrated by formula (I) with at least one carboxylic reagent illustrated by the following formulae (IV) and (V):

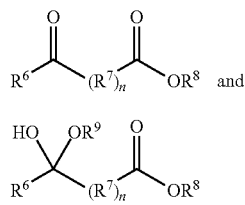

wherein each of $R^6$, $R^8$ and $R^9$ represents independently H or a hydrocarbon group, $R^7$ represents a divalent hydrocarbon group, and n is equal to 0 or to 1. Such compounds and the methods for their making are disclosed in U.S. Pat. Nos. 5,739,356, 5,777,142, 5,786,490, 5,856,524, 6,020,500 and 6,114,547.

In another further embodiment, the acylation agent with hydrocarbon substitution may be made by reaction of any compound illustrated by formula (I) with any compound illustrated by formula (IV) or formula (V), the reaction being carried out in the presence of at least one aldehyde or at least one ketone. As suitable aldehydes, mention may be made of formaldehyde, acetaldehyde, propionaldehyde, butyraldehyde, isobutyraldehyde, pentanal, hexanal, heptaldehyde, octanal, benzaldehyde, as well as higher aldehydes. Other aldehydes such as dialdehydes, most particularly glyoxal are useful, even if monoaldehydes are generally preferred. In an embodiment, the aldehyde is formaldehyde, which may be provided in an aqueous solution, which is often called formalin, but which is most often used in the polymeric form which is called paraformaldehyde. Paraformaldehyde is considered as being a reactive equivalent and/or a source of formaldehyde. Like other reactive equivalents, mention may be made of hydrates or cyclic trimers. As suitable ketones, mention may be made of acetone, butanone, methylethylketone, as well as other ketones. In certain embodiments, one of the two hydrocarbon groups of the ketone is a methyl group. Mixtures of two or more of two aldehydes and/or ketones are also useful. Such acylation agents with hydrocarbon substitution and methods allowing their making are disclosed in U.S. Pat. Nos. 5,840,920, 6,147,036 and 6,207,839.

In another embodiment, the acylation agent with hydrocarbon substitution may comprise compounds of methylenebisphenol-alkanoic acid. Such compounds may be the fusion product (i) of an aromatic compound of formula (VI):

$$R_m-Ar-Z_c \qquad (VI)$$

and (ii) of at least one carboxylic reagent such as the compounds of formulae (IV) and (V) described above,
wherein in formula (VI):
each R represents independently a hydrocarbon group;
m is equal to 0 or represents an integer from 1 to 6, provided that m does not exceed the number of valencies of the corresponding Ar group available for the substitutions;
Ar represents an aromatic group or grouping containing from 5 to 30 carbon atoms and from 0 to 3 optional substituents such as amino-, hydroxy-amino, hydroxy- or alkyl-polyoxyalkyl, nitro, aminoalkyl and carboxy groups or combinations of two or more of two of said optional substituents;
Z represents independently —OH, —O, a lower alkoxy group or —$(OR^{10})_b OR^{11}$ wherein $R^{10}$ represents independently a divalent hydrocarbyl group, b is a number from 1 to 30, and $R^{11}$ represents —H or a hydrocarbyl group; and
c is a number which ranges from 1 to 3.

In an embodiment, at least one hydrocarbon group on the aromatic group is derived from polybutene.

In an embodiment, the source of the hydrocarbon groups described above stems from polybutenes obtained by polymerization of isobutylene in the presence of a Lewis acid catalyst such as aluminium trichloride or boron trifluoride. Such compounds and methods for their making are disclosed in U.S. Pat. Nos. 3,954,808, 5,336,278, 5,458,793, 5,620,949, 5,827,805 and 6,001,781.

In another embodiment, the reaction of (i) with (ii), optionally in the presence of an acid catalyst such as organic sulfonic acids, heteropolyacids and mineral acids, may be carried out in the presence of at least one aldehyde or of at least one ketone. The aldehyde or ketone reagent used in this embodiment is the same as those described above. Such compounds and methods for their making are disclosed in U.S. Pat. No. 5,620,949.

Further other suitable methods for making acylation agents with a hydrocarbon substitution will be found in U.S. Pat. Nos. 5,912,213, 5,851,966 and 5,885,944.

The detergents of the succinimide quaternary ammonium salt type are obtained by reaction of the acylation agent with hydrocarbon substitution as described above with a compound including an oxygen or nitrogen atom capable of fusing with the acylation agent. In an embodiment, the suitable compounds contain at least one tertiary amine function.

In an embodiment, this compound may be illustrated by one of the following formulae (VII) and (VIII):

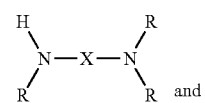

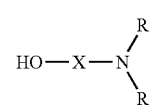

wherein, for both formulae (VII) and (VIII), each X represents independently an alkylene group containing from 1 to 4 carbon atoms, and each R represents independently a hydrocarbon group.

As suitable compounds, mention may be made, but without any limitation of: 1-aminopiperidine, 1-(2-aminoethyl) piperidine, 1-(3-aminopropyl)-2-pipecoline, 1-methyl-(4-methylamino)piperidine, 1-amino-2,6-dimethylpiperidine, 4-(1-pyrrolidinyl)-piperidine, 1-(2-aminoethyl)pyrrolidine, 2-(2-minoethyl)-1-methylpyrrolidine, N,N-diethyl-ethylenediamine, N,N-dimethylethylenediamine, N,N-dibutylethylenediamine, N,N,N-trimethylethylenediamine, N,N-dimethyl-N'-ethylethylenediamine, N,N-diethyl-N-methylethylenediamine, N,N,N'-triethylethylenediamine, 3-dimethylaminopropylamine, 3-diethylaminopropylamine, 3-dibutylaminopropylamine, N,N,N'-trimethyl-1,3-propanediamine, N,N,2,2-tetramethyl-1,3-propanediamine, 2-amino-5-diethylaminopentane, N,N,N',N'-tetraethyldiethylenetriamine, 3,3'-diamino-N-ethyldipropylamine, 3,3'-iminobis(N,N-dimethylpropylamine), N-methyl-1,3-diaminopropane, dibutylenetriamine, diethylenetriamine, dipropylenetriamine, triethylenetetraamine, tetraethylenepentamine, pentaethylenehexaamine, hexamethylenetetraamine and bis(hexamethylene)triamine, or combinations thereof.

In certain embodiments, the amine used is 3-dimethylaminopropylamine, 3-diethylamino-propylamine, 1-(2-aminoethyl)pyrrolidine, N,N-dimethylethylenediamine, or combinations thereof.

As other suitable compounds, mention may also be made of heterocyclic compounds with aminoalkyl substitution such as 1-(3-aminopropyl)imidazole and 4-(3-aminopropyl)morpholine, 1-(2-aminoethyl)piperidine, 3,3-diamino-N-methyl-dipropylamine, 3',3-aminobis(N,N-dimethylpropylamine). The latter has been mentioned in the preceding list.

As other compounds containing a nitrogen or oxygen atom which are also capable of fusing with the acylation agent and which also have a tertiary amine function, mention may be made of: alkanolamines, notably without any limitation, triethanolamine, trimethanolamine, N,N-dimethyl-aminopropanol, N,N-diethylaminopropanol, N,N-diethyl-aminobutanol, N,N,N-tris(hydroxyethyl)amine and N,N,N-tris(hydroxyl-methyl)amine.

The detergents of the succinimide quaternary ammonium salt type of the present invention are formed by combination of the reaction product described above (the reaction product of an acylation agent with hydrocarbon substitution and of a compound including an oxygen or nitrogen atom capable of fusing with said acylation agent and further including at least one tertiary amine function) with a suitable quaternization agent for converting the tertiary amine function into a quaternary nitrogen. Suitable quaternization agents are detailed below.

In certain embodiments, these preparations may be carried out without any solvent or in the presence of a solvent as described above. As a non-limiting example, preparations of succinimide quaternary ammonium salts are indicated below.

Example Q-1

Succinic polyisobutylene anhydride (100 parts by weight) which, as for it, is prepared by reaction of polyisobutylene with strong vinylidene content with a number average molecular mass equal to 1,000 and of maleic anhydride, is heated to 80° C. and is loaded in a jacketed reactor equipped with a stirrer, a condensor, a supply pump attached to a sub-addition tube (addition under the surface of the reaction mixture), with a nitrogen conduit and a thermocouple/temperature regulator. The reactor is heated to 100° C. Dimethylaminopropylamine (10.9 parts by weight) is loaded into the reaction, while maintaining the temperature of the batch below 120° C., within 8 hours. The reaction mixture is then heated to 150° C. and held at this temperature for 4 hours, in order to obtain a non-quaternized succinimide detergent.

A portion of the non-quaternized succinimide detergent (100 parts by weight) is then loaded in a similar reactor. Acetic acid (5.8 parts by weight) and 2-ethylhexanol (38.4 parts by weight) are added to the tank and the mixture is stirred and heated to 75° C. Propylene oxide (8.5 parts by weight) is added into the reactor within 4 hours, the reaction temperature being maintained at 75° C. The batch is held at this temperature for 4 hours. The resulting product contains a quaternized succinimide detergent.

Example Q-2

A non-quaternized succinimide detergent is prepared from a succinic polyisobutylene anhydride mixture, as described above (100 parts by weight) and with diluting oil—Pilot 900 (17.6 parts by weight)—which is heated with stirring to 110° C. under a nitrogen atmosphere. Dimethylaminopropylamine (DMAPA, 10.8 parts by weight) is slowly added within 45 minutes while maintaining the temperature of the batch below 115° C. The reaction temperature is brought to 150° C. and held at this value for a further 3 hours. The resulting compound is a non-quaternized succinimide detergent DMAPA.

A portion of this non-quaternized succinimide detergent (100 parts by weight) is heated with stirring to 90° C. Dimethyl sulfate (6.8 parts by weight) is loaded into the reactor and stirring is resumed at 300 revolutions/min under a nitrogen blanket. The exothermic reaction which occurs, raises the temperature of the batch to approximately 100° C. The reaction is maintained at 100° C. for 3 hours before cooling and decantation. The resulting product contains a dimethyl sulfate quaternary ammonium salt.

Quaternary Ammonium Salts with Polyalkene Substitution

In an embodiment, the quaternary ammonium salt is the reaction product:

(i)(b) of an amine with polyalkene substitution comprising at least one tertiary amine function and (ii) of a suitable quaternization agent for converting the tertiary amine function of the compound (i) into a quaternary nitrogen.

Suitable amines with polyalkene substitution may be derived from a polymer of an olefin and of an amine, such as ammonia, monoamines, polyamines or mixtures of these amines. They may be prepared by all kinds of methods. Suitable amines with polyalkene substitution or amines from which they derive, contain a tertiary amine function or else may be alkylated until they contain a tertiary amine function, from the moment that the amine with polyalkene substitution has at least one tertiary amine function when it is reacted with the quaternization agent.

A method for preparing an amine with polyalkene substitution consists of reacting a halogenated olefin polymer with an amine, as disclosed in U.S. Pat. Nos. 3,275,554, 3,438,757, 3,454,555, 3,565,804, 3,755,433 and 3,822,289.

Another method for preparing an amine with polyalkene substitution consists of reacting a hydro-formylated olefin with a polyamine and of hydrogenating the reaction product, as disclosed by U.S. Pat. Nos. 5,567,845 and 5,496,383.

Another method for preparing an amine with polyalkene substitution consists of converting a polyalkene, by means of a conventional epoxidation reagent, with or without a catalyst, into a corresponding epoxide and of converting the epoxide into an amine with polyalkene substitution by reaction with ammonia or an amine under reducing amination conditions, as disclosed by U.S. Pat. No. 5,350,429.

Another method for preparing an amine with polyalkene substitution consists of hydrogenating a β-aminonitrile, prepared by reaction of an amine with a nitrile, as disclosed in U.S. Pat. No. 5,492,641.

Another further method for preparing an amine with polyalkene substitution consists of hydroformylating polybutene or polyisobutylene, with a catalyst, such as rhodium or cobalt, in the presence of CO, H₂ and NH₃, at high pressures and temperatures, as disclosed by U.S. Pat. Nos. 4,832,702, 5,496,383 and 5,567,845.

The methods above for preparing amines with a polyalkene substitution are only given as an illustration and do not mean to be an exhaustive list. The scope of amines with polyalkene substitution of the present invention is not limited to their preparation methods disclosed above.

The amine with polyalkene substitution may be derived from polymers of olefins. Suitable polymers of olefins for preparing the amines with polyalkene substitution of the invention are the same as those described above.

The amine with polyalkene substitution may be derived from ammonia, monoamines, polyamines, or mixtures thereof, notably from mixtures of different monoamines, from mixtures of different polyamines, and from mixtures of monoamines and of polyamines (including diamines). As suitable amines, mention may be made of aliphatic, aromatic, heterocyclic and carbocyclic amines.

In an embodiment, the amines may be characterized by the formula:

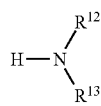

(IX)

wherein $R^{12}$ and $R^{13}$ each represent independently a hydrogen atom, a hydrocarbon group, a hydrocarbon group with amino substitution, a hydrocarbon group with hydroxy substitution, a hydrocarbon group with alkoxy substitution or acylimidoyl groups, provided that not more than one of the radicals $R^{12}$ and $R^{13}$ represents a hydrogen atom.

The amine may be characterized by the presence of at least one primary (H₂N—) or secondary (H—N<) amino group. These amines or the amines with polyalkene substitution for which they are used for preparing them, may be alkylated if required in order to make sure that they contain at least one tertiary amine function. As examples of suitable monoamines, mention may be made of ethylamine, dimethylamine, diethylamine, n-butylamine, dibutylamine, allylamine, isobutylamine, cocoamine, stearylamine, laurylamine, methyllaurylamine, oleylamine, N-methyl-octylamine, dodecylamine, diethanolamine, morpholine and octadecylamine.

Among the polyamines from which the detergent is derived, mention may mainly be made of alkyleneamines, most of them fitting the formula:

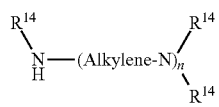

(X)

wherein n is an integer typically less than 10, each $R^{14}$ represents independently a hydrogen atom or a hydrocarbon group typically including up to 30 carbon atoms, and the alkylene group is typically an alkylene group including less than 8 carbon atoms.

Among the alkyleneamines, mention may mainly be made of ethyleneamines, hexyleneamines, heptyleneamines, octyleneamines, other polymethyleneamines. Specific examples thereof are the following: ethylenediamine, diethylenetriamine, triethylenetetramine, propylenediamine, decamethylenediamine, octamethylenediamine, di(heptamethylene)triamine, tripropylenetetramine, tetraethylenepentamine, trimethylene-diamine, pentaethylenehexamine, di(trimethylene)triamine, aminopropylmorpholine and dimethylaminopropylamine. Higher homologs such as those obtained by fusion of two or more than two of the alkylene-amines indicated above are also useful. Tetraethylenepentamine is particularly useful.

The ethyleneamines, which are also called polyethylene-polyamines, are most particularly useful. They are described in detail in the column "Ethylene Amines" in the Encyclopedia of Chemical Technology, Kirk and Othmer, Vol. 5, pp. 898-905, Interscience Publishers, New York (1950).

All the amines with polyalkene substitution above, or the amines from which they derive, which are secondary or primary amines, may be alkylated into tertiary amines by means of alkylation agents before being reacted with quaternization agents for forming additives of the quaternary ammonium salt type of the present invention. As suitable alkylation agents, mention may be made of the quaternization agents mentioned below.

The quaternary ammonium salts of amines with polyalkene substitution of the present invention are formed by combination of the reaction product described above (the amine with polyalkene substitution, including at least one tertiary amine function) with a suitable quaternization agent in order to convert the tertiary amine function into a quaternary nitrogen. Suitable quaternization agents are detailed below. As a non-limiting example, a preparation of a quaternary ammonium salt of an amine with polyalkyene substitution is shown below.

Example Q-3

A suitable apparatus for handling chlorine and hydrogen chloride gas (a glass reactor, glass stirrer, gaskets in PTFE, thermowell in glass for a thermocouple) is connected to washing devices with sodium hydroxide. The glass tank is loaded with polyisobutylene at a low content of vinylidene of Mn 1,000 (PIB, 100 grams) and is heated to 110-120° C. Chlorine (70 grams) is bubbled in the reactor for within 7 hours. The reaction mixture is then swept with nitrogen at 110-120° C. for one night in order to remove HCl.

The resulting PIB chloride is transferred into an autoclave and the autoclave is sealed. For each mole (~1,030 g) of PIB chloride, is added 1 mole of dimethylamine gas (DMA, 45 g) and the reaction is heated to 160-170° C. and is held at this temperature for 8 hours, or until a drop in pressure is no longer observed. The reaction is cooled to room temperature and the pressure is released. A sufficient amount of solvent Solvesso™ 150 is added in order to have a solution with 70% by weight of active substances and the reaction is stirred until it is homogeneous. The resulting polyisobutene-dimethylamine (PIB-DMA) solution is transferred into a dropping funnel and washed twice with a 2M sodium hydroxide solution, in order to remove HCl and NaCl. After separation, the product is dried on MgSO₄ and is filtered through a layer of Celite™ (diatomaceous earth).

The resulting PIB-DMA solution (41 grams of solution with 70% of active substances) is loaded into a glass reactor and stirred at room temperature. Dimethyl sulfate (3.3 grams) is added dropwise within one minute in order to obtain the quaternary ammonium salt. The mixture is stirred at room temperature for 1 hour under a nitrogen blanket and is sampled and titered with a green bromocresol indicator.

The resulting compound is a detergent of the type of a quaternary ammonium salt of an amine with polyalkyene substitution.

Quaternary Ammonium Mannich Salt

In an embodiment, the quaternary ammonium salt is the reaction product (i)(c) of a Mannich reaction product and (ii) of a suitable quaternization agent for converting the tertiary amine function of the compound (i) into a quaternary nitrogen.

The suitable Mannich reaction products have at least one tertiary amine function and are prepared by reaction of a phenol with hydrocarbon substitution, of an aldehyde and of an amine.

The hydrocarbon substituent of the phenol with hydrocarbon substitution may include from 10 to 400 carbon atoms, in another case from 30 to 180 carbon atoms, and in another case a further 10 or 40 to 110 carbon atoms. This hydrocarbon substituent may be derived from an olefin or from a polyolefin. As useful olefins, mention may be made of alpha-olefins, such as 1-decene, which are commercially available. As suitable polyolefins, mention may be made of those described in the preceding paragraph. The phenol with hydrocarbon substitution may be prepared by alkylation of a phenol with one of these suitable olefins or polyolefins, such as a polyisobutylene or a polypropylene, by means of well-known alkylation methods.

The aldehyde used for forming the Mannich detergent may include from 1 to 10 carbon atoms, and is generally formaldehyde or one of its reactive equivalents such as formalin or paraformaldehyde.

The amine used for forming the Mannich detergent may be a monoamine or a polyamine. The suitable amines for preparing the Mannich reaction product of the invention are the same as those described in the preceding paragraphs.

In an embodiment, the Mannich detergent is prepared by reaction of a phenol with hydrocarbon substitution, of an aldehyde and of an amine, as described in U.S. Pat. No. 5,697,988.

In an embodiment, the Mannich reaction product is prepared from an alkylphenol derived from a polyisobutylene, from formaldehyde and from a primary monoamine, a secondary monoamine or an alkylenediamine.

In certain of these embodiments, the amine is ethylenediamine or dimethylamine. Other suitable methods for preparing Mannich reaction products will be found in U.S. Pat. Nos. 5,876,468 and 5,876,468.

As indicated above, it may be necessary with certain of the amines to then react the Mannich reaction product with an epoxide or a carbonate, or another alkylation agent, in order to obtain the tertiary amine function.

The Mannich quaternary ammonium salts of the present invention are formed by combination of the reaction product described above (the Mannich reaction product including at least one tertiary amine function) with a suitable quaternization agent for converting the tertiary amine function into a quaternary nitrogen. Suitable quaternization agents are detailed below. As a non-limiting example, a preparation of a Mannich quaternary ammonium salt is shown below.

Example Q-4

Alkylated phenol (800 g) which, as for it, is prepared from polyisobutylene of Mn 1,000, and from diluting oil SO-44 (240 g) are loaded in a reactor according to the description above. A nitrogen blanket is applied to the tank and the mixture is stirred at 100 rpm. To this mixture, formalin (55.9 g) is added (dropwise) for 50 minutes. After this, dimethylamine (DMA, 73.3 g) is added (dropwise) for the next 50 minutes. The mixture is heated to 68° C. and held for one hour at this temperature. The mixture is then heated to 106° C. and maintained for a further 2 hours at this temperature. The temperature of the mixture is then brought to 130° C. and maintained for 30 minutes at this temperature before letting the mixture return to room temperature. The mixture is purified by distillation in vacuo (at 130° C. and −0.9 bars) in order to remove the remaining water, optionally for obtaining a Mannich DMA.

The Mannich DMA (1,700 g) is introduced into a reactor. Styrene oxide (263 g), acetic acid (66 g) and methanol (4564 g) are added to the tank and the mixture is heated with stirring and reflux (~75° C.) for 6.5 hours under a nitrogen blanket. The reaction is purified by distillation in vacuo (at 30° C. and at −0.8 bars). The resulting compound is a detergent of the Mannich quaternary ammonium salt type.

Quaternization Agent

As suitable quaternization agents for preparing any of the detergents of the quaternary ammonium salt type described above, mention may be made of dialkyl sulfates, benzyl halides, carbonates with hydrocarbon substitution, epoxides with hydrocarbon substitution used in combination with an acid, or mixtures thereof.

In an embodiment, the quaternization agent comprises halides such as chloride, iodide or bromide; hydroxides; sulfonates, alkyl sulfates such as dimethyl sulfate; sultones; phosphates; $C_{1-12}$ alkylphosphates; $C_{1-12}$ di-alkylphosphates; borates; $C_{1-12}$ alkylborates; nitrites; nitrates; carbonates, dicarbonates, alkanoates, O,O-di-($C_{1-12}$)alkyl dithiophosphates, or mixtures thereof.

In an embodiment, the quaternization agent may be: a dialkyl sulfate such as dimethyl sulfate, N-oxides, sultones such as propane- or butane-sultone, alkyl, acyl or aralkyl halides such as methyl and ethyl chloride, bromide or iodide or benzyl chloride, carbonates with hydrocarbyl (or alkyl) substitution, or combinations thereof. If the alkyl halide is benzyl chloride, the aromatic ring is optionally further substituted with alkyl or alkenyl groups.

The hydrocarbon (or alkyl) groups of the carbonates with hydrocarbon substitution may contain from 1 to 50, 2 to 20, 1 to 10 or 1 to 5 carbon atoms per group.

In an embodiment, the carbonates with hydrocarbon substitution contain two hydrocarbon groups which may either be identical or different. As suitable examples of carbonates with hydrocarbon substitution, mention may be made of dimethyl or diethyl carbonate.

In another embodiment, the quaternization agent may be an epoxide with hydrocarbon substitution, illustrated by the following formula:

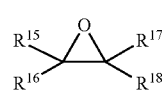

(IX)

wherein $R^{15}$, $R^{16}$, $R^{17}$ and $R^{18}$ may represent independently H or a $C_{1-50}$ hydrocarbon group. As suitable examples of epoxide with hydrocarbon substitution, mention made be made of: styrene oxide, ethylene oxide, propylene oxide, butylene oxide, stilbene oxide, $C_{2-50}$ epoxides or combinations thereof.

All the quaternization agents described above, whichever they might be, notably epoxides with hydrocarbon substitution, may be used in combination with an acid. As suitable acids, mention may be made of carboxylic acids, such as acetic acid, propionic acid, butyric acid and the like.

Preferably, the acylation agent with hydrocarbon substitution is polyisobutylene succinic anhydride and the compound including an oxygen or nitrogen atom capable of fusing said acylation agent is selected from dimethylaminopropylamine, N-methyl-1,3-diaminopropane, N,N-dimethylaminopropylamine, N,N-diethylaminopropylamine, N,N-dimethylaminoethylamine, diethylenetriamine, dipropylenetriamine, dibutylenetriamine, triethylenetetraamine, tetraethylenepentaamine, pentaethylenehexaamine, hexamethylenetetraamine and bis(hexamethylene)triamine.

Oxygenated Detergent

In certain embodiments, the compositions of the present invention further comprise an oxygenated detergent additive.

The oxygenated detergent additive may comprise a hydrocarbon compound bearing at least two substituents which are carboxy functions in the form of acids or at least one carboxy function in anhydride form.

In certain embodiments, the oxygenated detergent additive is a hydrocarbon compound bearing at least two substituents which are carboxy functions in the form of acids or anhydrides.

In other embodiments, the oxygenated detergent additive is a succinic acylation agent with hydrocarbon substitution.

In other embodiments, the oxygenated detergent additive with hydrocarbon substitution is a dimeric acid compound.

In other further embodiments, the oxygenated detergent additive with hydrocarbon substitution of the present invention comprises a combination of two or more than two of oxygenated detergents described in this column.

As a suitable oxygenated detergent additive with hydrocarbon substitution, mention may be made of dimeric acids. Dimeric acids are a type of diacid polymer derived from fatty acids and/or from polyolefins, notably the polyalkenes described here which contain an acid function.

In certain embodiments, the dimeric acids used in the present invention are derived from $C_{10}$-$C_{20}$, $C_{12}$-$C_{18}$ and/or $C_{16}$-$C_{18}$ polyolefins.

Among these oxygenated detergent additives with hydrocarbon substitution, mention may be made of acids, halides, succinic anhydrides, and combinations thereof.

In certain embodiments, the agents are acids or anhydrides, and in other embodiments, the agents are anhydrides and in other further embodiments, the agents are hydrolyzed anhydrides. The hydrocarbon compound of the substituted hydrocarbon additive and/or the primary hydrocarbon group of the succinic acylation agent with hydrocarbon substitution generally contains an average of at least 8, or 30, or 35 up to 350, or up to 200, or up to 100 carbon atoms.

In an embodiment, the hydrocarbon group is derived from a polyalkene. As suitable polyalkenes, mention may be made of homopolymers and interpolymers of polymerizable olefin monomers with from 2 to 16 or 6 or 4 carbon atoms. As suitable olefins and polyolefins, mention may be made of all those described in the preceding columns.

In certain embodiments, the olefin is a monoolefin such as ethylene, propylene, 1-butene, isobutene and 1-octene, or a polyolefinic monomer, such as a diolefinic monomer such as 1,3-butadiene and isoprene.

In an embodiment, the interpolymer is a homopolymer. An example of a polymer is polybutene. In a particular case, 50% of the polybutene stems from isobutylene. Polyalkenes are prepared by standard operating procedures.

In an embodiment, the hydrocarbon groups are derived from polyalkenes for which the Mn value is of at least 1,300, or 1,500, or 1,600 up to 5,000, or up to 3,000, or up to 2,500, or up to 2,000, or up to 1,800, and the Mw/Mn ratio is 1.5 or 1.8, or 2, or up to 2.5 to 3.6, or up to 3.2.

In certain embodiments, the polyalkene is a polyisobutylene having a molecular mass from 800 to 1,200.

In another embodiment, the acylation agents with hydrocarbon substitution and/or substituted succinic acylation agents are prepared by reaction of the polyalkene described above with an excess of maleic anhydride in order to obtain substituted succinic acylation agents in which the number of succinic groups for each weight equivalent of substituting group is of at least 1.3, or up to 1.5, or up to 1.7 or up to 1.8. The maximum number will generally not exceed 4.5, or up to 2.5 or up to 2.1 or up to 2.0. The polyalkene may here be any of those described above.

In another embodiment, the hydrocarbon and/or the hydrocarbon group contains an average of 8, or 10, or 12 up to 40, or up to 30, or up to 24 or up to 20 carbon atoms.

In an embodiment, the hydrocarbon group contains an average of 16 to 18 carbon atoms.

The olefin, the olefin oligomer or the polyalkene may be reacted with the carboxylic reagent so that there is at least one mole of carboxylic reagent per mole of olefin, olefin oligomer or polyalkene which reacts.

As examples of patents describing various operating procedures for preparing useful acylation agents, mention may be made of U.S. Pat. Nos. 3,172,892, 3,215,707, 3,219,666, 3,231,587, 3,912,764, 4,110,349 and 4,234,435.

In certain embodiments, the oxygenated detergents with hydrocarbon substitution and/or the succinic acylation agents with hydrocarbon substitution contain a diacid function.

In certain embodiments, the hydrocarbon group of the succinic acylation agent with hydrocarbon substitution is derived from polyisobutylene and the diacid function of the agent is derived from carboxylic acid groups, such as a succinic acid with hydrocarbon substitution.

In certain embodiments, the acylation agent with hydrocarbon substitution comprises one or several succinic anhydride groups with hydrocarbon substitution.

In certain embodiments, the acylation agent with hydrocarbon substitution comprises one or several hydrolyzed succinic anhydride groups with hydrocarbon substitution.

In certain embodiments, the oxygenated detergent is a polyisobutylene compound including a succinic anhydride or succinic acid head group.

The oxygenated detergent may be a succinic polyisobutylene anhydride and/or a hydrolyzed version of the latter. The preparation of suitable oxygenated detergents is described in International Patent Application WO 2006/063161 A2.

As a non-limiting example, the preparations of two oxygenating detergents are shown below.

Example O-1

Glissopal™ 1000 (18.18 kg) is loaded in a tank sealed at 100° C. and stirred. The tank is heated to 167° C. and vacuum is applied. The tank is then pressurized with a nitrogen atmosphere (1 bar) while it is heated to 175° C. Once the product has reached 175° C., maleic anhydride (2.32 kg) is added by means of a syringe pump with a heated jacket (ISCO pump) within about 9 hours. The reaction temperature is slowly raised, for the whole duration of the supply of maleic anhydride, from 175° C. in order to attain 225° C. at the end of the loading. The reaction is then held at 225° C. for a further 10 hours. The resulting polyisobutylene succinic anhydride (PIBSA) has a kinematic viscosity at 100° C. of 570 cSt (mm/s) and a total acid number (TAN) of 127 mg KOH/g.

Example O-2

The PIBSA of example O-1 (340 g) is loaded into a reactor and mixed with Pilot™ 900 (60 g). The contents of the tank is stirred at 400 rpm for 1 hour, and then heated to 90° C. The tank is then loaded with nitrogen in order to provide an inert atmosphere. Water (5.9 g) is added to the mixture within 10 minutes. The mixture is then stirred for 2 hours. The resulting hydrolyzed PIBSA has a total acid number of 163 mg/KOH and a kinematic viscosity at 100° C. of 500 mm/s (cSt). The product formed contained 85% by weight of hydrolyzed product and 15% by weight of Pilot® 900. The carbonyl/water ratio is 0.5/1.

When the detergent compositions of the present invention contain both a detergent of the quaternary ammonium salt type and an oxygenated detergent, the weight ratio of the detergent of the quaternary ammonium salt type to the oxygenated detergent may be from 1/10 to 10/1, 1/8 to 8/1, 1/1 to 8/1 or 3/1 to 7/1, all the weight ratios being calculated on a basis without any solvent. In other embodiments, the weight ratio may be from 2/1 to 4/1.

As understood here, the term of "hydrocarbon substituent" or "hydrocarbon group" is used in its ordinary sense, which is well known to one skilled in the art. In order to be more specific, it designates a group including a carbon atom directly attached on the remainder of the molecule and having a mainly hydrocarbon nature. As examples of hydrocarbon groups, mention made be made of: hydrocarbon substituents, i.e. aliphatic substituents (for example alkyl or alkenyl), alicyclic substituents (for example cycloalkyl, cycloalkenyl) and aromatic substituents with an aromatic, aliphatic and alicyclic substitution, as well as the cyclic substituents in which the ring is completed with another portion of the molecule (for example two substituents form together a ring); substituted hydrocarbon substituents, i.e. substituents containing non-hydrocarbon groups which, within the context of this invention, do not modify the mainly hydrocarbon nature of the substituent (for example halogeno (most specially chloro and fluoro), hydroxy, alkoxy, mercapto, alkylmercapto, nitro, nitroso and sulfoxy); hetero-substituents, i.e. the substituents which while having a mainly hydrocarbon nature, within the context of this invention, contain something other than carbon in a ring or a chain moreover consisting of carbon atoms. As heteroatoms, mention may be made of sulfur, oxygen, nitrogen, and this covers substituents like pyridyl, furyle, thienyl and imidazolyl. Generally, not more than two, preferably not more than one, non-hydrocarbon substituents will be present per group of 10 carbon atoms in the hydrocarbon group, and typically there will not be any non-hydrocarbon substituents in the hydrocarbon group.

The present invention also relates to a method for preparing the composition according to the invention, said method comprising a step for putting into contact and mixing a detergent and a dispersion according to the invention, whereby the composition is obtained.

The composition of the invention, i.e. the composition containing the additive for assisting regeneration of the PF in the form of a dispersion of particles of an iron compound in crystallized form and the detergent, may be obtained by mixing the detergent composition and the dispersion by any conventional means allowing the mixing, this mixing being generally obtained by stirring at a temperature close to room temperature (from 15 to 30° C.).

The weight ratio between the dispersion and the detergent composition may greatly vary according to different parameters such as the characteristics of the engine and of its equipment notably the fuel injectors, its polluting emissions, notably the amount of emitted soots, the architecture of the exhaust and depollution line, notably the use of a PF or a Catalyzed Filter containing a catalyst and its proximity to the manifold of the engine, the means allowing an increase in the temperature in order to trigger the regeneration or further the geographical area in which the vehicle will circulate, the latter defining the quality of the fuel which the vehicle will use.

This weight ratio between the dispersion and the detergent composition may typically vary between 10/90 and 90/10, in certain cases between 20/80 and 80/20 and in certain further more specific cases between 30/70 and 70/30. The ratio may advantageously be selected beyond 50/50 i.e. with a larger proportion of dispersion than of detergent.

In the composition of the present invention, the iron content may be comprised between 0.05% and 25%, more particularly between 2% and 15%, this concentration being expressed in weight % of iron metal based on the total weight of the composition.

The organic dispersions according to the invention have the particularity, once they are additived with the fuel, of not consequently reducing the stability of said fuel, in particular when the latter contains not very stable fractions such as fractions of biofuels like methyl esters of vegetable oils. The stability of the fuel may be measured through its resistance to oxidation.

For this several types of test are known to the profession. Mention may be made of the test based on the NF EN 15751 standard (Fuels for automobiles—Fatty acid methyl esters (FAME) and mixtures with gas oil—Determination of the stability to oxidation by an accelerated oxidation method) consisting of oxidizing the heated fuel by air bubbling. The vapors produced during the oxidation process are condensed in water. An increase in the electric conductivity of this water expresses solubilization of volatile acid compounds formed during the process of oxidation of the fuel and thereby its oxidation. This is then referred to as an induction time, a time representing the duration of heating required for the occurrence of a rapid increase in the electric conductivity. The greater this induction time, the more the fuel resists oxidation. This test is also called a RANCIMAT test.

Another type of test consists of quantifying by chemical dosage (such as according to the ISO 6619 standard), increase in the acidity of the heated fuel following oxygen bubbling (Aging test EN ISO 12205 (petroleum products—Determination of the stability to oxidation of medium petroleum distillates (1966)). The time-dependent change of the acidity is expressed according to the acidity or Δ TAN difference between the aged and non-aged fuel. The greater the Δ TAN the more the fuel was oxidized.

The invention also relates to an additived fuel comprising a fuel and a composition according to the invention.

The invention also relates to a method for preparing an additived fuel according to the invention, comprising a step for putting into contact and mixing a fuel and a composition according to the invention, whereby the additived fuel is obtained.

The compositions according to the invention may be used as a fuel additive for internal combustion engines, more particularly as an additive of gasoils for diesel engines or other engines such as certain gasoline engines emitting soots or carbonaceous particles, and for example as additives of biofuels.

They may more generally be used as combustion additives in combustible materials or liquid fuels of energy generators such as internal combustion engines (positive ignition engines), electric generating sets, oil burners or jet propulsion engines.

The additive fuels according to the invention may be used in combination with a PF not containing any catalyst, or else with a PF containing a catalyst such as a CSF.

The nature of the catalyst making up the CSF may be of any type, notably based on precious metals such as platinum or palladium associated with different supporting or binding materials such as alumina. Materials which may be reduced like oxides based on rare earths, such as cerium oxide or oxides based on manganese may also be associated.

The compositions according to the invention or a Fuel Borne Catalyst (FBC), may be additived to fuels according to any means known to one skilled in the art, both by a vectorization device loaded on-board a vehicle but also directly additived in the fuel before the latter is introduced on the vehicle. The latter case may advantageously be used in the case of vehicle fleets equipped with PFs and having their own gas station for refilling with fuel.

The devices loaded on-board the vehicle may notably be devices comprising a tank, giving the possibility of loading on-board a volume of the composition according to the invention and giving the possibility of covering a certain range, as well as a means for vectorizing the composition towards the fuel like a metering pump injecting a defined amount of the composition into the fuel tank of the vehicle and a tool for driving this vectorization means.

The engine may be continuously fed with a fuel additived with FBC, the concentration may be stable or variable over time. The engine may also be alternatively fed with an additive and non-additived fuel. The amount of FBC to be added to the fuel may widely vary depending on different parameters such as the characteristics of the engine and of its equipment, its polluting emissions, notably the amount of emitted soots, the architecture of the exhaust and depolluting line, notably the use of a PF or of an CSF containing a catalyst and its proximity to the manifold of the engine, the means allowing an increase in the temperature for triggering regeneration or else in the geographical area in which the vehicle will circulate, the latter defining the quality of the fuel which the vehicle will use.

The FBC may also be injected into the exhaust line upstream from the PF, preferably with a means allowing final dispersion of the particles into the bed of soots. This case is particularly adapted to the case when the regeneration of the PF is accomplished by direct injection of the fuel into the exhaust line upstream from the PF, whether this fuel is burned on an oxidation catalyst upstream from the PF or else by a burner or by any other means.

Preferably, the fuel comprised in the additived fuel is selected from the group consisting of gas oils and biofuels.

The fuels suitable for preparing an additived fuel according to the present invention notably comprise commercially available fuels and in certain embodiments, all the commercially available gas oil fuels and/or biofuels.

The gas oil fuels may also be called diesel fuels.

The fuels based on bio-additives are also called biofuels.

The suitable fuels for applying the invention are not too limited, and are generally liquid at room temperature, for example from 20 to 30° C.

The liquid fuel may be a fuel of the hydrocarbon type, a fuel of a type other than a hydrocarbon, or one of their mixtures.

The fuel of the hydrocarbon type may be a petroleum distillate, notably a gasoline according to the definition given by the ASTM D4814 standard or a gas oil fuel according to the definition given by the ASTM D975 standard or the European standard EN590+A1.

In an embodiment, the liquid fuel is a gasoline, and in another embodiment, the liquid fuel is a lead-free gasoline.

In another embodiment, the liquid fuel is a gas oil fuel.

The fuel of the hydrocarbon type may be a hydrocarbon prepared by a method for transforming a gas into a liquid in order to include for example hydrocarbons prepared by a process such as the Fischer-Tropsch process.

In certain embodiments, the fuel applied in the present invention is a gas oil fuel, a gas oil biofuel or combinations thereof.

The fuel of a type other than a hydrocarbon may be a composition containing oxygen atoms, which is often called an oxygenation product, which comprises an alcohol, an ether, a ketone, an ester of a carboxylic acid, a nitroalkane, or one of their mixtures.

The fuel of a type other than a hydrocarbon may for example comprise methanol, ethanol, methyl-t-butyl ether, methyl ethyl ketone, trans-esterified oils and/or fats of vegetable or animal origin such as rape seed methyl ester and soya methyl ester, and nitromethane.

The mixtures of fuels of the hydrocarbon type and of the type other than a hydrocarbon may comprise for example gasoline and methanol and/or ethanol, gas oil fuel and ethanol, and gas oil fuel and a trans-esterified vegetable oil such as rape seed methyl ester and other bio-derived fuels.

In an embodiment, the liquid fuel is a water emulsion in a fuel of the hydrocarbon type, a fuel of a type other than a hydrocarbon, or one of their mixtures.

In several embodiments of this invention, the liquid fuel may have a sulfur content, on a basis by weight, which is of 5,000 ppm or less, a 1,000 ppm or less, or 300 ppm or less, 200 ppm or less, 30 ppm or less or 10 ppm or less.

The liquid fuel of the invention is present in an additived fuel according to the invention in a major amount, i.e. generally greater than 95% by weight, and in other embodiments, it is present in an amount of more than 97% by weight, of more than 99.5% by weight or more than 99.9% by weight.

The fuels suitable for applying the present invention optionally comprise one or several additional performance additives, solvents or diluents. These performance additives may be of any type and for example allow improvement in the distribution of the fuel in the engine and/or the improvement of the performances of the operation of the engine and/or improvement in the stability of the operation of the engine.

As an example and without being limited, it is possible to mention antioxidants like sterically hindered phenol, detergent and/or dispersant additives such as nitrogen-containing detergents or succinimides or further agents improving cold flow such as an esterified copolymer of maleic anhydride and styrene.

The compositions of the present invention may further comprise one or several additional performance additives, solvents or diluents.

The additional performance additives may comprise: an antioxidant such as a sterically hindered phenol or one of its derivatives and/or a diarylamine or one of its derivatives; a corrosion inhibitor; and/or a detergent/dispersant additive, other than the additive for fuel of the present invention, such as a polyetheramine or a nitrogen-containing detergent, notably, but without any limitation, PIB-amine detergents/dispersants and succinimide detergent/dispersants.

The additional performance additives may also cover: an agent improving cold flow such as an esterified copolymer of maleic anhydride and of styrene and/or a copolymer of ethylene and vinyl acetate; a foam inhibitor and/or an anti-foam agent such as a silicone oil; a de-emulsifier such as polyalkoxylated alcohol; a creaminess agent such as a carboxylic fatty acid; a metal deactivator such as an aromatic triazole or one of its derivatives, notably, but without any limitation, benzotriazole; and/or an additive against valve seat recession such as an alkaline metal sulfosuccinate salt.

The total combined amount of the present additional performance additive compounds, on a base without any solvent/oil, may range from 0 or 0.01% by weight to 65, 50, or even 25% by weight, or from 0.01% by weight to 20% by weight of the composition. Even if one or several of the other performance additives may be present, it is common that the other performance additives are present in different amounts relatively to each other.

The invention also relates to a method for applying an internal combustion engine comprising a step for delivering to said engine a fuel and a composition according to the invention.

In an embodiment, the composition of the invention is combined with the fuel by direct addition and the additived fuel is used for operating an engine equipped with an exhaust system with a PF or a CSF.

The additived fuel containing the composition of the invention may be contained in a fuel tank, transmitted to the engine where it is combusted, and the iron oxide particles reduce the oxidation temperature of the soots collected in the PF.

In another embodiment, one resorts to the operating procedure above, except that the composition of the invention is maintained on-board the apparatus driven by the engine (for example an automobile, a bus, a truck, etc.), in a tank with a composition separated from the fuel. In these embodiments, the composition is combined or mixed with the fuel during the operation of the engine. Like other techniques, it is also possible to add the composition of the invention to the fuel and/or to the fuel tank, or at the fuel deposits before filling the tank of the motor-driven vehicle.

The composition of the invention may be added to the fuel in an amount that such that the iron mass content in the additived fuel is comprised from 1 ppm to 50 ppm, more particularly from 2 ppm to 20 ppm, in iron metal based on the total mass of the fuel.

When the invention is used as a liquid fuel composition for an internal combustion engine, suitable internal combustion engines cover the spark ignition engines and compression ignition engines; 2 stroke or 4 stroke cycles; a liquid fuel obtained by direct injection, indirect injection, injection by a nozzle and a carburetor; the current systems with a rail injector and a pump-injector; engines for lightweight vehicles (for example a passenger vehicle) and heavy duty vehicles (for example a commercial truck); and engines which operate with fuels of the hydrocarbon type and of the type other than a hydrocarbon and mixtures thereof. The engines may be part of integrated emission systems containing elements such as EGR systems; a post-treatment including a three-way catalyst, an oxidation catalyst, NOx absorbers and catalysts, catalyzed and non-catalyzed particle traps; variable distribution; and synchronization of the injection and a configuration of the flow rate.

It is known that some of the products described above may interact in the final formulation, so that the constituents of the final formulation may be different from those which are added initially. The thereby formed products, notably the products formed by means of the composition of the present invention in its envisioned use, may not be easily described. Nevertheless, all these alternatives and all these reaction products enter the scope of the present invention; the present invention covers the compositions prepared by mixing the constituents described above.

EXAMPLES

Example 1: Preparation of the Dispersions

Dispersion 1A

Preparation of the Iron Precursor Solution

One liter of solution is prepared in the following way: 576 g of $Fe(NO_3)_3$ are mixed with 99.4 g of $FeCl_2, 4 H_2O$. The mixture is completed with distilled water in order to obtain one liter of solution. The final concentration of this solution of iron precursors is 1.5 $mol \cdot L^{-1}$ of Fe.

Preparation of the Soda Solution

A 6 $mol \cdot L^{-1}$ NaOH solution is prepared in the following way: 240 g of soda tablets are diluted in distilled water in order to obtain one liter of solution.

In a one liter reactor equipped with a stirring system, a tank bottom consisting of 400 mL of sodium nitrate $NaNO_3$ solution at 3 $mol \cdot L^{-1}$ is introduced. The pH of the solution is adjusted to 11 with a few drops of 6 mol/L soda. The formation of the precipitate is accomplished by simultaneous addition of the solution of iron precursors and of the soda solution prepared earlier. The introduction flow rates of both of these reagents are adjusted so that the pH is maintained constant and equal to 11 at room temperature.

823.8 g of the solution obtained by precipitation (i.e. 21.75 g of an $Fe_2O_3$ equivalent or further 0.27 moles of Fe), neutralized beforehand, are redispersed in a solution containing 24.1 g of isostearic acid (Prisorine 3501 provided by Croda) and 106.4 g of Isopar L. The suspension is introduced into a jacketed reactor equipped with a thermostated bath and provided with a stirrer. The reaction mixture is brought to 90° C. for 4 h.

After cooling, the mixture is transferred into a test tube. Demixing is observed and a 500 mL aqueous phase and a 100 mL organic phase are collected.

This organic dispersion has an iron mass content of 10%, expressed on the basis of iron metal, based on the total mass of the collected dispersions. The iron content is determined by X fluorescence analysis directly on the dispersion. This same technique is used in the following of the examples for monitoring the iron content.

Dispersion 1B

Preparation of the Iron Precursor Solution

One liter of solution is prepared in the following way: 576 g of $Fe(NO_3)_3$ are mixed with 99.4 g of $FeCl_2, 4 H_2O$. The mixture is completed with distilled water in order to obtain 1 liter of solution. The final concentration of iron precursors in this solution is 1.5 $mol \cdot L^{-1}$ of Fe.

Preparation of the Soda Solution

A 6 $mol \cdot L^{-1}$ NaOH solution is prepared in the following way: 240 g of soda tablets are diluted in distilled water in order to obtain one liter of solution.

In a one liter reactor equipped with a stirring system, a tank bottom consisting of 400 mL of 3 $mol \cdot L^{-1}$ sodium nitrate NaNO$_3$ solution is introduced. The pH of the solution is adjustable to 13 by a few drops of soda at 6 mol/L. The formation of the precipitate is accomplished by simultaneously adding the solution of iron precursors and the solution of soda prepared earlier. The introduction flow rates of both of these reagents are adjusted so that the pH is maintained constant and equal to 13 at room temperature.

823.8 g of the solution obtained by precipitation (i.e. 21.75 g of an Fe$_2$O$_3$ equivalent or further 0.27 moles of Fe) neutralized beforehand, are redispersed in a solution containing 24.1 g of istostearic acid (Prisorine 3501, a cut provided by Croda) and 106.4 g of Isopar L. The suspension is introduced into a jacketed reactor equipped with a thermostatic bath and provided with a stirrer. The reaction mixture is brought to 90° C. for 4 h.

After cooling, the mixture is transferred into a test tube. Demixing is observed and a 500 mL aqueous phase and a 100 mL organic phase are collected.

This organic dispersion has an iron mass content of 10% expressed in iron metal mass based on the total mass of the collected dispersion.

Characterization by X-Ray Diffraction (XRD)

XRD analysis of the dispersions of Example 1 was conducted according to the indications given in the description.

It is seen that the peaks of the diffractograms of dispersion 1A and of dispersion 1B actually correspond to the characteristic XRD diffraction peaks of the crystallized magnetite and/or maghemite phase (sheet ICCD 01-088-0315).

The calculation of the crystallite size according to the method shown earlier, leads to crystallite sizes of 9 nm for the dispersion 1A and 4 nm for the dispersion 1B, respectively.

Characterization by Transmission Electron Microscopy (TEM)

The TEM analysis was conducted according to indications given in the description.

The characteristics stemming from this TEM counting: percentage of particles of less than 7 nm, $\varphi_{50}$, polydispersity index $P_n$ as defined in the description are reported in Table 1.

TABLE 1

Characterization by TEM of the dispersions of Example 1

|  | % of particles <7 nm | $\varphi_{50}$ (nm) | $P_n$ |
| --- | --- | --- | --- |
| Dispersion 1A | 72% | 5.7 nm | 0.35 |
| Dispersion 1B | 95% | 3.8 nm | 0.35 |

Characterization by Dynamic Light Scattering (DLS)

The DLS analysis was conducted according to the indications given in the description.

The average hydrodynamic diameters $D_h$ in intensity are reported in Table 2.

TABLE 2

Characterization by DLS of dispersions of Example 1

|  | $D_h$ (nm) |
| --- | --- |
| Dispersion 1A | 22 |
| Dispersion 1B | 11.6 |

Example 2: Preparation of the Detergent Compositions

Example 2A

A detergent composition is prepared, consisting of a succinimide quaternary ammonium salt derived from dimethylaminopropylamine succinimide, from 2-ethylhexyl alcohol and from acetic acid, and it is subject to quaternization with propylene oxide and it is prepared by a method essentially similar to the one described in Example Q-1 above.

Example 2B

A detergent composition is prepared by mixing 50 parts by weight of the succinimide quaternary ammonium salt of Example 2A with 18 parts by weight of an oxygenated detergent, all the parts by weight being calculated on a basis without any solvent. The mixing of the constituents is carried out under ambient conditions. The oxygenated detergent is a succinic polyisobutylene anhydride derived from polyisobutylene with a strong content of vinylidene of a number average molecular mass equal to 1,000 and from maleic anhydride and is prepared by a method essentially similar to the one described in Example O-1.

Example 2C

A detergent composition is prepared according to the operating procedures of Example 2B, except that 35 parts by weight of the succinimide quaternary ammonium salt are used with 9 parts by weight of the oxygenated detergent, all the parts by weight being calculated on a basis without a solvent.

Example 2D

A detergent composition is prepared according to the operating procedures of Example 2B, except that the oxygenated detergent is hydrolyzed by reaction with water, in order to form a succinic polyisobutylene acid prepared by a method essentially similar to the one described in Example O-2.

Example 2E

A detergent composition is prepared according to the operating procedures of Example 1A, except that the succinimide quaternary ammonium salt is derived from dimethylaminopropylamine succinimide and from dimethyl sulfate and is prepared by a method essentially similar to the one described in Example Q-2, except that more solvent is present in order to obtain a mixture having an active substance level of 65% by weight in a petroleum naphtha solvent.

Example 2F

A detergent composition is prepared according to the operating procedures of Example 2C, except that the oxygenated detergent is hydrolyzed by reaction with water, in order to form a succinic polyisobutylene acid prepared by a method essentially similar to the one described in Example O-2.

Example 3: Preparation of Fuel Additives Compositions

Eight fuel additive compositions (3A to 3I) consisting in mixtures of the dispersions 1A or 1B of Example 1 and of the detergents of Examples 2A or 2F are prepared by mixing at room temperature each liquid in controlled proportions.

Thus, 42.78 g of the dispersion 1A are mixed with 32.08 g of the detergent of Example 2F and 25.13 g of solvent, said solvent being a mixture of ISOPAR and of 2-ethylhexanol. The mixture is maintained with stirring at 120 rpm. The stirring of the mixture is maintained for 30 minutes and the quality of the mixture is monitored by measuring the iron content at the top and at the bottom of the obtained liquid.

At the end of 30 minutes of stirring, the iron content at the top and at the bottom of the liquid is the same. This additive composition, subsequently called composition 3B, contains 4.3% by weight of iron metal.

The other compositions are prepared in the same way by using controlled amounts of the dispersions 1A or 1B, detergents of Example 2A or 2F and an optional solvent.

Table 3 shows the amounts of each component for the different compositions as well as their iron content.

TABLE 3 composition of the additives and iron content

| compo-sition | dispersion (g) Example 1A | dispersion (g) Example 1B | detergent (g) Example 2A | detergent (g) Example 2F | solvent (g) | Mass % of Fe |
|---|---|---|---|---|---|---|
| 3A | 100 | — | — | — | — | 10.0 |
| 3B | 42.78 | — | — | 32.08 | 25.13 | 4.3 |
| 3C | 53.50 | — | — | 26.03 | 20.47 | 5.4 |
| 3D | 64.88 | — | — | 19.72 | 15.40 | 6.5 |
| 3E | — | 42.84 | — | 32.12 | 25.03 | 4.3 |
| 3F | — | 53.50 | — | 26.03 | 20.47 | 5.4 |
| 3G | — | 65.29 | — | 19.72 | 15.30 | 6.5 |
| 3H | — | 64.07 | 35.93 | — | — | 6.4 |
| 3I | — | 73.27 | 26.73 | — | — | 7.3 |

Example 4: Stability of the Compositions in a Gasoil Fuel

An additived fuel is prepared in order to measure the stability of the compositions according to the invention with said fuel. For this, a certain amount of composition is added to the fuel in order to reach a mass concentration of 7 ppm of iron metal in the fuel. The additived fuel is then continuously heated to 70° C. and the duration of stability of the additived composition is quantified.

The additived composition is considered as stable when the iron content in the fuel has not decreased by more than 10%.

The fuel used here is a fuel containing approximately 11% by mass of biofuel (fatty acid methyl ester or FAME) (Table 4).

TABLE 4

Main characteristics of the B10 fuel

| Fuel Composition | | B10 |
|---|---|---|
| Aromatic | mass % | 24 |
| Polyaromatic | mass % | 4 |

TABLE 4-continued

Main characteristics of the B10 fuel

| Fuel Composition | | B10 |
|---|---|---|
| FAME | volume/volume % | 10.8 |
| Sulfur | mg/kg | 5 |
| Carbon residue (on the 10% distillation residue) | mass %/mass % | <0.2 |
| Copper | mg/kg | 0 |
| Zinc | mg/kg | 0 |

A specific amount of each of the additive compositions is added to 250 ml of fuel so as to obtain, after homogenization, 7 ppm of iron metal in the fuel and optional presence of one or several detergent molecules in the added composition:

composition 3A: 14.8 mg
composition 3B: 25.9 mg
composition 3C, 22.0 mg
composition 3D: 19.3 mg
composition 3E: 25.9 mg
composition 3F: 22.0 mg
composition 3G: 19.2 mg
composition 3H, 23.1 mg
composition 3I: 20.2 mg.

The time dependent change in the iron content in the fuel is quantified by regularly sampling a 20 ml volume of fuel in the upper portion of the fuel. This volume, once filtered to 0.2 μm, is analyzed by X Fluorescence in order to determine the iron content.

TABLE 5

Stability in the fuel at 70° C. (in days)

| Additived fuel | Stability in the fuel |
|---|---|
| composition 3A | 1 |
| composition 3B | >50* |
| composition 3C | >50* |
| composition 3D | >50* |
| composition 3E | >50* |
| composition 3F | >50* |
| composition 3G | >50* |
| composition 3H | >50* |
| composition 3I | >50* |

*"> x" means that the test was voluntarily stopped after x days at 70° C., without observing over x days any significant change in the % of Fe It is seen (Table 5) that the compositions 3B to 3I according to the invention have a clearly increased stability relatively to the composition 3A without any detergent, since no decrease in the iron content is measured after 50 days of continuous heating at 70° C. of the additived fuels. The stability of the compositions according to the invention is therefore greater than 50 days at 70° C.

Example 5: Compatibility of the Fuel and of the Additive Compositions

The compatibility of the fuel of the B10 type in Example 4 is measured with addition of the additive compositions of Example 3 (3A, 3B, 3C, 3D, 3E, 3F, and 3G).

For this, a certain amount of dispersion is added to the fuel in order to reach a 7 ppm mass concentration of iron metal in the fuel, according to the same procedure as the one described in Example 4.

The compatibility of the fuel was evaluated by using the NF EN 15751 standard (Fuels for automobiles—Fatty acid methyl esters (FAME) and mixtures with gas oil—Determination of the stability to oxidation by an accelerated oxidation method).

For this test, a dry air flow (10 Uh) bubbles in 7.5 g of the fuel heated to 110° C. The vapors produced during the oxidation process are carried away by the air into a cell containing demineralized water and an electrode measuring the conductivity of water. This electrode is connected to a measurement and recording system. This system indicates the end of the induction period when the conductivity of the water rapidly increases. This rapid increase in the conductivity is caused by solubilization in the water of the volatile carboxylic acids formed during the oxidation process of the fuel.

Table 6 shows that in the presence of the compositions containing a detergent containing at least one quaternary ammonium salt (compositions 3B to 3I), the induction time of the additived fuel is greater than for the additived fuel of the composition 3A alone (not containing any detergent of the quaternary ammonium type), which expresses less oxidation of the fuel and thus better compatibility.

TABLE 6

Induction time of the fuel with and without FBC

|  | Induction time (h) |
|---|---|
| composition 3A | 35.6 |
| composition 3B | 42.2 |
| composition 3C | 40.9 |
| composition 3D | 39.8 |
| composition 3E | 41.7 |
| composition 3F | 39.8 |
| composition 3G | 37.9 |
| composition 3H | 37.4 |
| composition 3I | 36.7 |

Example 6: Engine Test for Regeneration of a Particle Filter

The efficiency of the dispersions described in the preceding examples for regenerating a particle filter (PF) was measured through engine tests for regenerating PFs. For this, a diesel engine provided by the Volkswagen group (4 cylinders, 2 liters, turbocompressor with air cooling, 81 kW) was used on an engine test bench.

The exhaust line mounted downstream is a commercial line consisting of an oxidation catalyst containing a washcoat based on platinum and aluminum followed by a PF in silicon carbide (PF: total volume 2.52 L, diameter 5.66 inches, length 5.87 inches).

The fuel used is a commercial fuel meeting the EN590 DIN 51628 standard, containing less than 10 ppm of sulfur and containing 7% by volume of FAME.

For these tests, the fuel is additived with different compositions 3B and 3E of Example 3. The added composition content is adjusted so as to add into the fuel a composition amount corresponding to 7 ppm by weight (composition 3B) or 5 ppm by weight (composition 3E) of iron expressed in the form of iron metal based on the total mass of fuel. As a comparison, a third test was conducted with the same fuel but not additived with any composition.

The test is conducted in two successive steps: a step for loading the PF, followed by a step for regenerating the latter. The conditions of both of these steps are strictly identical for the three tests, except for the fuel used (either additived or not).

The loading phase is carried out by running the engine at a speed of 3000 revolutions/min (rpm) and by using a torque of 45 Nm for approximately 6 hours. This loading phase is stopped when 12 g of particulate phases are loaded in the PF. During this phase, the temperature of the gases upstream from the PF is from 230 to 235° C. Under these conditions, the emissions of particles are of about 2 g/h.

After this loading phase, the PF is disassembled and weighed in order to check the mass of particles loaded during this phase (particulate phase amount in the PF after loading from Table 7).

The PF is then reassembled on the bench and reheated with the engine which is put back for 30 minutes under the operating conditions of the loading (3,000 rpm/45 Nm).

The conditions of the engine are then modified (torque 80 Nm/2,000 rpm) and post-injection is required from the electronic central unit of the engine (ECU), which allows a rise in temperature upstream from the PF to 450° C. and starting the regeneration of the PF. These conditions are maintained for 35 minutes (2100 seconds), this time being counted from the starting of the post-injection.

The PF regeneration efficiency is measured through two parameters:
 the % of burned soots, which corresponds to the combustion rate of soots calculated at each instant t according to the reduction in the pressure drop $\Delta P(t)$:

$$\% \text{ burnt soots} = \frac{\Delta P(\text{beginning of regeneration}) - \Delta P(t)}{\Delta P(\text{beginning of regeneration})} \times 100$$

100% of burnt soots corresponding to the stabilization of the pressure drop to the lowest level observed under these conditions with an PF not containing any soots. In the case of the tests conducted with the additived fuel, the pressure drop stabilizes before the end of the regeneration test which gives the possibility of calculating this criterion. In the case of the test with the non-additived fuel, the pressure drop remains high and is not stabilized which does not allow this criterion to be calculated.
 the mass of burnt particles during regeneration, calculated from the weighing operations of the PF before loading, after loading and at the end of the regeneration.

Generally, the higher these parameters, the more the regeneration is efficient.

The results are grouped in Table 7

TABLE 7

| Presence of an additive in the fuel | aucun | 3B | 3E |
|---|---|---|---|
| Iron content in the fuel (ppm by weight of Fe) | 0 | 7 | 5 |
| Amount of particulate phase in the PF after loading (g) | 12.2 | 12.4 | 12.0 |
| Amount of iron in the PF resulting from the additive (g)* | 0 | 0.18 | 0.12 |
| Particles burnt during the regeneration (35 minutes) (g) | 2.2 | 12.0 | 11.5 |
| Particles burnt during the regeneration (35 minutes) (%) | 18 | 97 | 96 |
| Pressure drop at the beginning of the regeneration (mbars) | 87.1 | 82.1 | 85.9 |
| Pressure drop after 35 minutes at 450° C. (mbars) | 65.6 | 30.4 | 30.3 |
| % of burnt soots after 5 minutes of regeneration | — | 43.4 | 45.9 |
| % of burnt soots after 10 minutes of regeneration | — | 82.8 | 83.7 |

TABLE 7-continued

| Presence of an additive in the fuel | aucun | 3B | 3E |
|---|---|---|---|
| % of burnt soots after 15 minutes of regeneration | — | 95.3 | 95.0 |
| % of burnt soots after 20 minutes of regeneration | — | 98.7 | 98.1 |
| % of burnt soots after 35 minutes of regeneration | — | 100 | 100 |

*calculated considering a loading of the PF for 6 hours with a fuel consumption of 4 kg/h It is seen that the presence of an additive in the fuel gives the possibility of obtaining regeneration of the PF at 450° C. since 96 to 97% of the soots are burnt after 35 minutes at 450° C. while in the absence of the additive only 18% of the soots are burnt. The same applies if the pressure drop is observed on the PF which is more greatly reduced in the presence of an additive: it drops in both cases from about 83-86 mbars to about 30 mbars while without any additive, the pressure drop after 35 minutes at 450° C. remains greater than 65 mbars expressing incomplete regeneration.

When the compositions 3B and 3E are compared, it is seen that both compositions lead to closely related combustion kinetics if the time-dependent change of the pressure drop is observed at different times through the calculation of the percent of burnt soots (5, 10, 15, 20 or 35 minutes) of the regeneration at 450° C. However, this efficiency is obtained with a smaller amount of additive (5 ppm of iron metal here) for the additive prepared from the dispersion containing crystallites of the magnetite and/or maghemite type of smaller size (4 nm here for composition 3E). When the size of the crystallites is 9 nm (composition 3B), the amount to be introduced corresponds to an iron metal content of 7 ppm by weight.

The whole of the Examples illustrates that the compositions containing crystallites of the magnetite and/or maghemite type of small size (typically 4 nm) may be highly effective at a low dosage while not notably degrading the fuel.

The invention claimed is:

1. A composition comprising a dispersion and a detergent comprising a quaternary ammonia salt, said dispersion comprising:
   an organic phase;
   at least one amphiphilic agent, and
   solid objects dispersed in the organic phase, in the form of individualized particles or particle aggregates, consisting of an iron compound in crystallized form, such that said particles have an average size $\overline{D}_{XRD}$ of less than or equal to 12 nm as measured by X-ray diffraction, the particles have a median diameter $\varphi_{50}$ comprised between 3 nm and 12 nm,
wherein said quaternary ammonia salt comprises a reaction product:
   (i) of at least one compound which may comprise:
      (a) the condensation product of an acylation agent with hydrocarbon substitution and of a compound comprising an oxygen or nitrogen atom capable of condensing the acylation agent, the condensation product having at least one tertiary amine function;
      (b) and amine with polyalkene substitution comprising at least one tertiary amine function; and
      (c) a Mannich reaction product comprising at least one tertiary amine function, the Mannich reaction product being derived from a phenol with hydrocarbon substitution, from an aldehyde and from an amine; and
   (ii) of a suitable quaternization agent for converting the tertiary amine function of the compound (i) into a quaternary nitrogen, and
wherein the iron content is comprised between 0.05% and 25% by weight of iron metal based on the total weight of said composition.

2. The composition according to claim 1, further comprising an oxygenated detergent additive.

3. The composition according to claim 1, wherein the quaternary ammonium salt comprises the product of the reaction:
   (i) of the condensation product of an acylation agent with hydrocarbon substitution and of a compound comprising an oxygen or nitrogen atom capable of fusing the acylation agent, the condensation product having at least one tertiary amine function; and
   (ii) of a quaternization agent comprising dialkyl sulfates, benzyl halides, carbonates with hydrocarbon substitution, epoxides with hydrocarbon substitution in combination with an acid or mixtures thereof.

4. The composition according to claim 3, wherein the acylation agent with hydrocarbon substitution is succinic polyisobutylene anhydride and the compound including an oxygen or nitrogen atom capable of fusing said acylation agent is selected from dimethylaminopropylamine, N-methyl-1,3-diaminopropane, N,N-dimethylaminopropylamine, N,N-diethylaminopropylamine, N,N-dimethylaminoethylamine, diethylenetriamine, dipropylenetriamine, dibutylenetriamine, triethylenetetraamine, tetraethylenepentaamine, pentaethylenehexaamine, hexamethylenetetraamine and bis(hexamethylene)triamine.

5. The composition according to claim 1, wherein the oxygenated detergent additive is a polyisobutylene compound including a succinic anhydride or succinic acid head group.

6. The composition according to claim 1, wherein the average size $\overline{D}_{XRD}$ of the particles is less than or equal to 8 nm.

7. The composition according to claim 1, wherein the organic phase of the dispersion is based on an apolar hydrocarbon.

8. The composition according to claim 1, wherein the amphiphilic agent is a carboxylic acid which generally includes from 10 to 50 carbon atoms.

9. The composition according to claim 1, wherein at least 80% by number of the particles have a size $D_{TEM}$ of less than or equal to 12 nm as measured by transmission microscopy.

10. The composition according to claim 1, wherein the solid objects of the invention have a hydrodynamic diameter $D_h$ of less than or equal to 50 nm as measured by dynamic light scattering.

11. The composition according to claim 1 wherein the molar ratio between the number of moles of amphiphilic agent and the number of moles of iron is comprised from 0.2 to 1.

12. A fuel additive for internal combustion engines consisting of the composition according to claim 1.

13. A method for preparing a composition comprising a step for putting into contact and mixing a detergent comprising a quaternary ammonium salt and a dispersion, wherein the dispersion comprises:
   an organic phase;
   at least one amphiphilic agent, and
   solid objects dispersed in the organic phase, in the form of individualized particles or particle aggregates, consisting of an iron compound in crystallized form, such that said particles have an average size $\overline{D}_{XRD}$ of less than or equal to 12 nm as measured by X-ray diffraction, the particles have a median diameter $\varphi_{50}$ comprised between 3 nm and 12 nm, wherein said quaternary ammonia salt comprises a reaction product:

(i) of at least one compound which may comprise:

(a) the condensation product of an acylation agent with hydrocarbon substitution and of a compound comprising an oxygen or nitrogen atom capable of condensing the acylation agent, the condensation product having at least one tertiary amine function;

(b) and amine with polyalkene substitution comprising at least one tertiary amine function; and (c) a Mannich reaction product comprising at least one tertiary amine function, the Mannich reaction product being derived from a phenol with hydrocarbon substitution, from an aldehyde and from an amine; and (ii) of a suitable quaternization agent for converting the tertiary amine function of the compound (i) into a quaternary nitrogen, and wherein the iron content is comprised between 0.05% and 25% by weight of iron metal based on the total weight of said composition, whereby said composition is obtained.

14. An additived fuel comprising a fuel and a composition according to claim 1.

15. The additived fuel according to claim 14, wherein the fuel is selected from the group consisting of gas oils and biofuels.

16. The additived fuel according to claim 14, wherein the iron mass content is comprised from 1 to 50 ppm, of iron metal based on the total mass of the fuel.

17. A method for applying an internal combustion engine comprising a step for delivering to said engine a fuel and a composition according to claim 1.

18. A fuel additive for internal combustion engines consisting of a composition comprising a dispersion and a detergent comprising a quaternary ammonia salt, said dispersion comprising:

an organic phase, only one amphiphilic agent, and solid objects dispersed in the organic phase in the form of individualized particles or particle aggregates, consisting of an iron compound in crystallized form, such that said particles have an average size $D_{XRD}$ of less than of equal of 12 nm measured by X-ray diffraction.

19. The fuel additive according to claim 18, wherein the amphiphilic agent is selected from the group consisting of: fatty acids of tall oil, soybean oil, tallow oil, linseed oil, oleic acid, linoleic acid, stearic acid and its isomers, pelargonic acid, capric acid, lauric acid, myristic acid, dodecylbenzenesulfonic acid, ethyl-2-hexanoic acid, naphthenic acid, and hexanoic acid.

* * * * *